United States Patent
Shibata et al.

(10) Patent No.: US 12,199,236 B2
(45) Date of Patent: Jan. 14, 2025

(54) SULFIDE SOLID ELECTROLYTE AND TREATMENT METHOD THEREFOR

(71) Applicant: IDEMITSU KOSAN CO., LTD., Chiyoda-ku (JP)

(72) Inventors: Masayuki Shibata, Chiba (JP); Hiroaki Yamada, Chiba (JP); Nobuhito Nakaya, Ichihara (JP); Yusuke Iseki, Chiba (JP); Minoru Senga, Sodegaura (JP); Takashi Hayakawa, Chiba (JP); Shogo Shimada, Ichihara (JP); Tomoyuki Okuyama, Ichihara (JP); Koji Kato, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 18/184,707

(22) Filed: Mar. 16, 2023

(65) Prior Publication Data

US 2023/0223594 A1    Jul. 13, 2023

Related U.S. Application Data

(62) Division of application No. 17/254,477, filed as application No. PCT/JP2019/045851 on Nov. 22, 2019, now Pat. No. 11,658,337.

(30) Foreign Application Priority Data

Nov. 22, 2018  (JP) ................. 2018-219130
Aug. 9, 2019   (JP) ................. 2019-148211

(51) Int. Cl.
*H01M 10/0562* (2010.01)
*H01B 1/10* (2006.01)
*H01M 10/42* (2006.01)

(52) U.S. Cl.
CPC .......... *H01M 10/0562* (2013.01); *H01B 1/10* (2013.01); *H01M 10/4235* (2013.01);
(Continued)

(58) Field of Classification Search
CPC ................................. H01M 10/0562
See application file for complete search history.

(56) References Cited

U.S. PATENT DOCUMENTS

2005/0196673 A1  9/2005  Biensan
2009/0136836 A1  5/2009  Xu
(Continued)

FOREIGN PATENT DOCUMENTS

CN   1947288    * 4/2007
CN   103796964 A   5/2014
(Continued)

OTHER PUBLICATIONS

Office Action mailed Jun. 15, 2021 in co-pending U.S. Appl. No. 17/254,477, 9 pages.
(Continued)

*Primary Examiner* — Brian R Ohara
(74) *Attorney, Agent, or Firm* — Oblon, McClelland, Maier & Neustadt, L.L.P.

(57) ABSTRACT

A sulfide solid electrolyte, which is able to adjust the morphology unavailable traditionally, or is readily adjusted so as to have a desired morphology, the sulfide solid electrolyte having a volume-based average particle diameter measured by laser diffraction particle size distribution measurement of 3 μm or more and a specific surface area measured by the BET method of 20 m²/g or more; and a method of treating a sulfide solid electrolyte including the sulfide solid electrolyte being subjected to at least one mechanical treatment selected from disintegration and granulation.

15 Claims, 5 Drawing Sheets

(Embodiment C)

(Embodiment D)

(52) U.S. Cl.
CPC .............. *H01M 2300/0068* (2013.01); *H01M 2300/008* (2013.01)

(56) References Cited

U.S. PATENT DOCUMENTS

| | | | |
|---|---|---|---|
| 2014/0227610 A1 | 8/2014 | Aburatani | |
| 2014/0228200 A1* | 8/2014 | Toyoshima | H01M 4/8828 502/1 |
| 2015/0318555 A1* | 11/2015 | Oku | H01M 4/667 429/245 |
| 2017/0155170 A1* | 6/2017 | Sato | H01M 10/0562 |
| 2018/0226681 A1 | 8/2018 | Hasegawa | |
| 2019/0013542 A1 | 1/2019 | Otaki | |
| 2019/0051878 A1* | 2/2019 | Kusakabe | H01M 50/489 |
| 2019/0356017 A1* | 11/2019 | Osada | H01M 10/0562 |

FOREIGN PATENT DOCUMENTS

| | | |
|---|---|---|
| CN | 107108328 A | 8/2017 |
| CN | 108780682 A | 11/2018 |
| CN | 108780683 A | 11/2018 |
| JP | 2013-20894 A | 1/2013 |
| JP | 2014-212065 A | 11/2014 |
| WO | WO 2018/193992 A1 | 10/2018 |
| WO | WO 2018/193994 A1 | 10/2018 |

OTHER PUBLICATIONS

Office Action mailed Aug. 24, 2021 in co-pending U.S. Appl. No. 17/254,477, 12 pages.
Office Action mailed Mar. 7, 2022 in co-pending U.S. Appl. No. 17/254,477, 7 pages.
Office Action mailed Jul. 22, 2022 in co-pending U.S. Appl. No. 17/254,477, 10 pages.
International Search Report issued Feb. 10, 2020 in PCT/JP2019/045851 filed Nov. 22, 2019, 3 pages.
Extended European Search Report issued Jul. 13, 2022 in European Patent Application No. 19888015.5, 10 pages.
Stöffler, H., et al., "L$^+$-Ion Dynamics in β-Li$_3$PS$_4$ Observed by NMR: Local Hopping and Long-Range Transport", The Journal of Physical Chemistry C, vol. 122, No. 28, pp. 15954-15965, Jun. 26, 2018, XP055938252.
Combined Chinese Office Action and Search Report issued Oct. 10, 2022 in Chinese Patent Application No. 201980039786.9, 20 pages.
Korean Office Action issued Apr. 3, 2024 in Korean Application No. 10-2020-7035373 with English translation, 10 pgs.

* cited by examiner (Embodiment A)      (Embodiment B)

(Embodiment C)      (Embodiment D)

SULFIDE SOLID ELECTROLYTE AND TREATMENT METHOD THEREFOR

CROSS-REFERENCE TO RELATED APPLICATIONS

The present application is a division of U.S. patent application Ser. No. 17/254,477, which is a 35 U.S.C. § 371 national stage patent application of International patent application PCT/JP2019/045851 filed on Nov. 22, 2019, which is based on and claims the benefits of priority to Japanese Application No. 2019-148211 filed on Aug. 9, 2019 and Japanese Application No. 2018-219130 filed on Nov. 22, 2018. The entire contents of these applications are incorporated herein by reference.

TECHNICAL FIELD

The present invention relates to a sulfide solid electrolyte and a treatment method therefor.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

From the viewpoint of performance and production of all-solid-state lithium batteries, a solid electrolyte having a small particle diameter is demanded. In all-solid-state lithium batteries, all of a positive electrode material, a negative electrode material, and an electrolyte are solid, and therefore, when the particle diameter of the solid electrolyte is small, there is an advantage such that it becomes easy to form a contact interface between the active material and the solid electrolyte, and a pass between ionic conduction and electronic conduction becomes favorable. As a method for making the particle diameter small (also referred to as "atomization"), for example, a production method including steps of adding an ether compound to a coarse particle material of a sulfide solid electrolyte material and atomizing the coarse particle material through pulverization treatment (see, for example, PTL 1) is disclosed; and it is disclosed that a particle of a solid electrolyte having a BET specific surface area of 1.8 to 19.7 m$^2$/g, which is used in an all-solid-state lithium ion secondary battery, is obtained through atomization and heating steps (see, for example, PTL 2).

CITATION LIST

Patent Literature

PTL 1: JP 2013-020894 A
PTL 2: WO 2018/193992 A

SUMMARY OF INVENTION

Technical Problem

However, in the method of atomization according to, for example, PTLs 1 and 2, in order to suppress such properties that on pulverizing a coarse particle, though granulation (particle growth) is liable to be generated, a dispersant is added, there is a case where a lowering of an ionic conductivity of the solid electrolyte is caused due to the fact that dispersant remains. In addition, in order to atomize the coarse particle, a large pulverization energy is required, whereby the crystallinity is reduced. For that reason, the crystallinity is enhanced upon heating; however, there is involved such a problem that in order to contemplate to enhance the crystallinity, granulation (particle growth) is generated, and in order to contemplate to suppress the granulation (particle growth), sufficient granulation is not obtained.

A desirable optimum morphology of the solid electrolyte, such as particle diameter, varies with a positive electrode material, a negative electrode material, and an electrolyte of the all-solid-state lithium battery. However, according to the conventional method for atomizing the coarse particle, as mentioned previously, the reduction of crystallinity owing to a large pulverization energy and the granulation during re-heating treatment must be adjusted by setting the respective conditions. This adjustment is extremely difficult, and furthermore, the production costs further increase, and therefore, it may not be said that the foregoing method is a realistic method on an industrial scale.

In view of the aforementioned circumstances, the present invention has been made, and an object thereof is to provide a sulfide solid electrolyte that is a precursor for mechanical treatment which is able to adjust the morphology unavailable traditionally, or is readily adjusted so as to have a desired morphology and further a treatment method of a solid electrolyte, in which this is subjected to mechanical treatment, thereby enabling one to adjust the morphology.

Solution to Problem

In order to solve the aforementioned problem, the present inventor made extensive and intensive investigations. As a result, it has been found that the foregoing problem can be solved by the following inventions.

1. A sulfide solid electrolyte having a volume-based average particle diameter measured by laser diffraction particle size distribution measurement of 3 μm or more and a specific surface area measured by the BET method of 20 m$^2$/g or more.
2. A treatment method of a sulfide solid electrolyte, including subjecting a sulfide solid electrolyte having a volume-based average particle diameter measured by laser diffraction particle size distribution measurement of 3 μm or more and a specific surface area measured by the BET method of 20 m$^2$/g or more to at least one mechanical treatment selected from disintegration and granulation.

Advantageous Effects of Invention

In accordance with the present invention, a sulfide solid electrolyte which is able to adjust the morphology unavailable traditionally, or is readily adjusted so as to have a desired morphology and further a treatment method of a sulfide solid electrolyte, in which this is subjected to mechanical treatment, thereby enabling one to adjust the morphology, can be provided.

DESCRIPTION OF PREFERRED EMBODIMENTS

Figure 1:
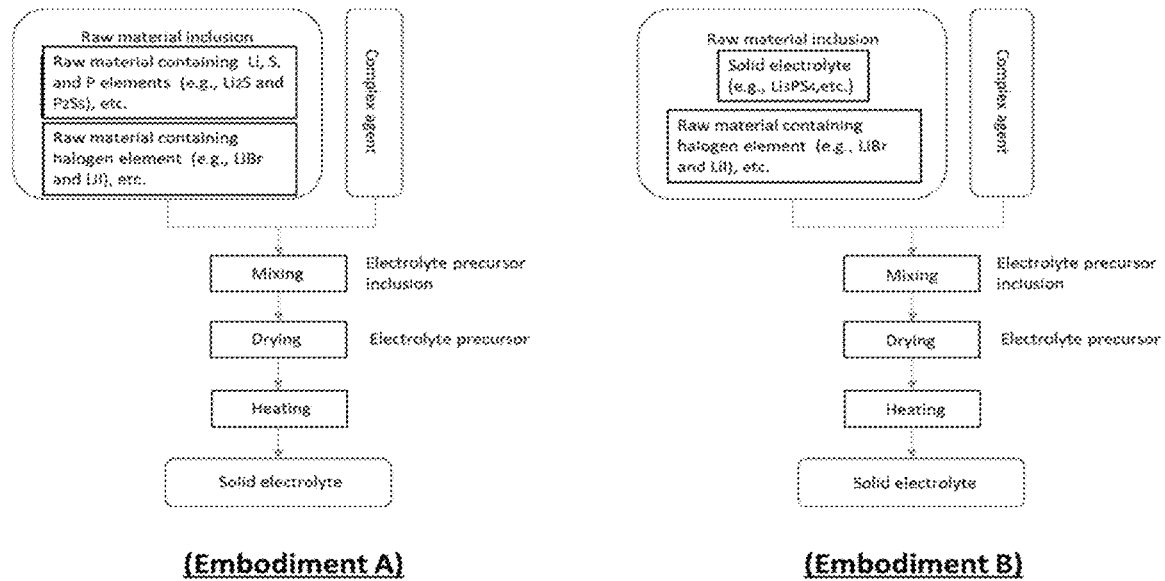
FIG. 1 is a flow chart of explaining one example of preferred embodiments of a production method of a precursor for mechanical treatment.

Embodiments of the present invention (in this specification, the embodiment will be sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

[Sulfide Solid Electrolyte]

The sulfide solid electrolyte of the present embodiment is one having a volume-based average particle diameter measured by laser diffraction particle size distribution measurement of 3 μm or more (in this specification, the foregoing average particle diameter will be sometimes referred to simply as "average particle diameter") and a specific surface area measured by the BET method of 20 $m^2/g$ or more (in this specification, the foregoing specific surface area will be sometimes referred to simply as "specific surface area").

Although the sulfide solid electrolyte of the present embodiment is able to be used for a sulfide solid electrolyte as it stands, when allowing it to have the predetermined volume-based average particle diameter and specific surface area, the sulfide solid electrolyte of the present embodiment becomes extremely suitable as a precursor for mechanical treatment for adjusting the morphology through at least one mechanical treatment selected from disintegration and granulation (in this specification, the foregoing mechanical treatment will be sometimes referred to simply as "mechanical treatment") (in this specification, the foregoing precursor for mechanical treatment will be sometimes referred to simply as "precursor for mechanical treatment"). Accordingly, it is preferred that the sulfide solid electrolyte of the present embodiment is used as the precursor for mechanical treatment. Here, in this specification, the term "morphology" means various properties which the solid electrolyte particle has, and in particular, it is an average particle diameter and a specific surface that are properties required regarding the production of a solid electrolyte.

When the volume-based average particle diameter falls within the aforementioned relatively large range, in general, an interface between the solid electrolytes is hardly taken, so that a favorable battery performance is hardly obtained; and when the specific surface area falls within the aforementioned relatively large range, on the occasion of forming a slurry, the viscosity is liable to become high, and the slurry coating properties become worse, so that a lowering of the production efficiency of an all-solid-state lithium battery is liable to be generated. However, in view of the fact that the aforementioned average particle diameter and specific surface area are provided, and especially, the specific surface area is relatively large, the precursor for mechanical treatment has a porous structure, and therefore, it has properties such that in order to provide a solid electrolyte in which even when applying a smaller energy, it is readily collapsed and has the desired morphology, disintegration (atomization) and granulation (particle growth) through mechanical treatment are readily achieved. In addition, in view of the fact that a small energy is sufficient, it becomes possible to widely select an instrument to be used for the mechanical treatment.

Figure 6:
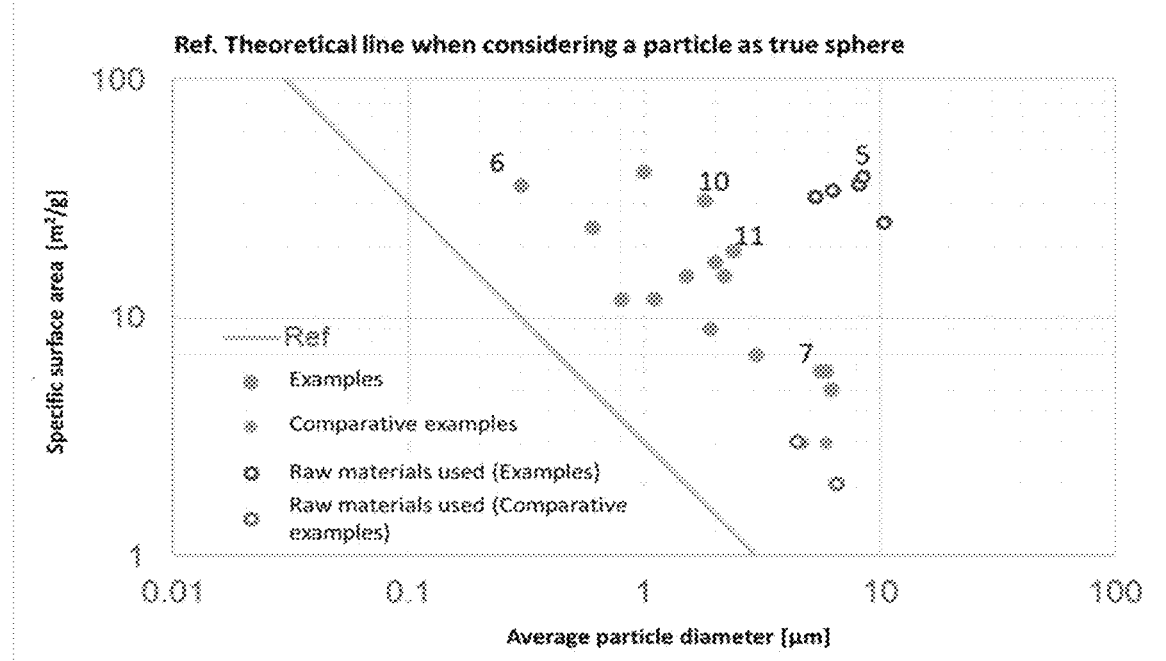
FIG. 6 is a graph showing a relation between a particle diameter and a specific surface area of each of sulfide solid electrolytes obtained in Examples.
Figure 7:
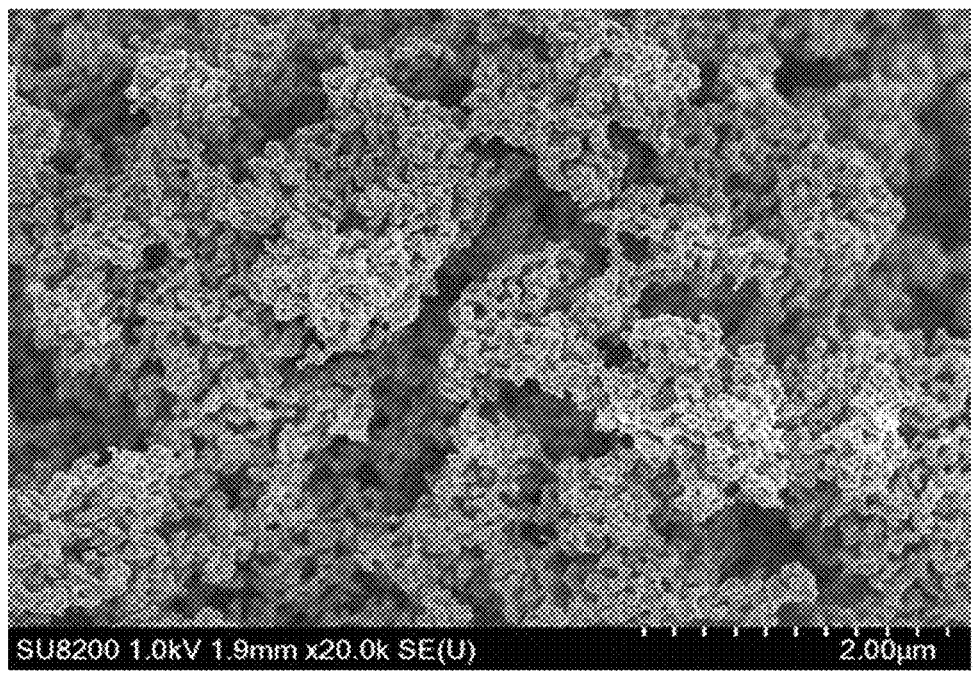
FIG. 7 is a photographed image by a scanning electron microscope (SEM) of a sulfide solid electrolyte obtained in Example 5.
Figure 8:
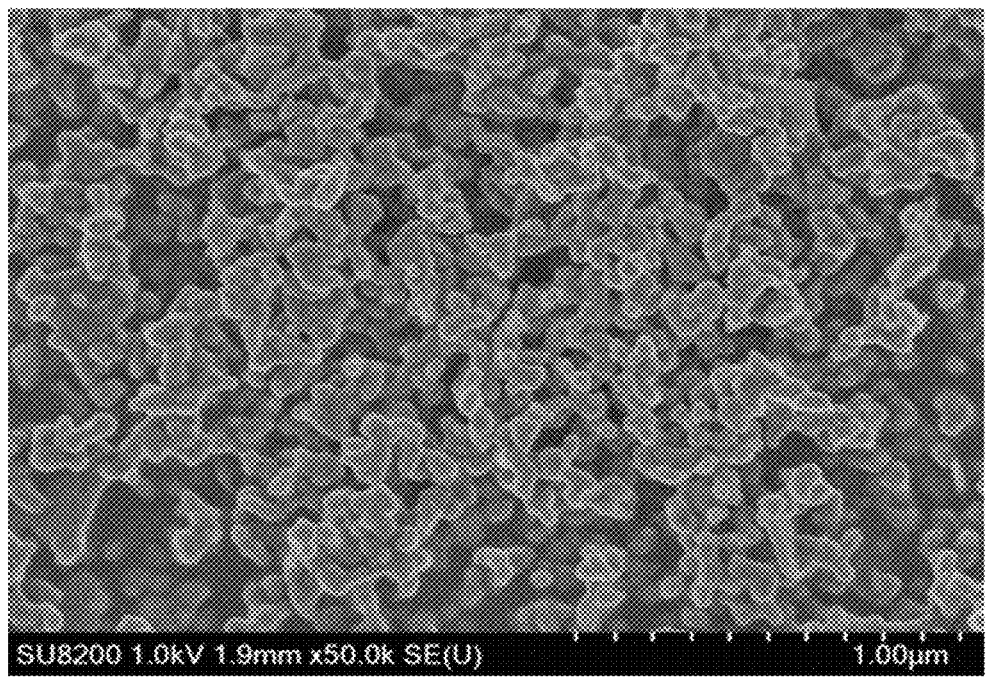
FIG. 8 is a photographed image by a scanning electron microscope (SEM) of a sulfide solid electrolyte obtained in Example 6.
Figure 9:
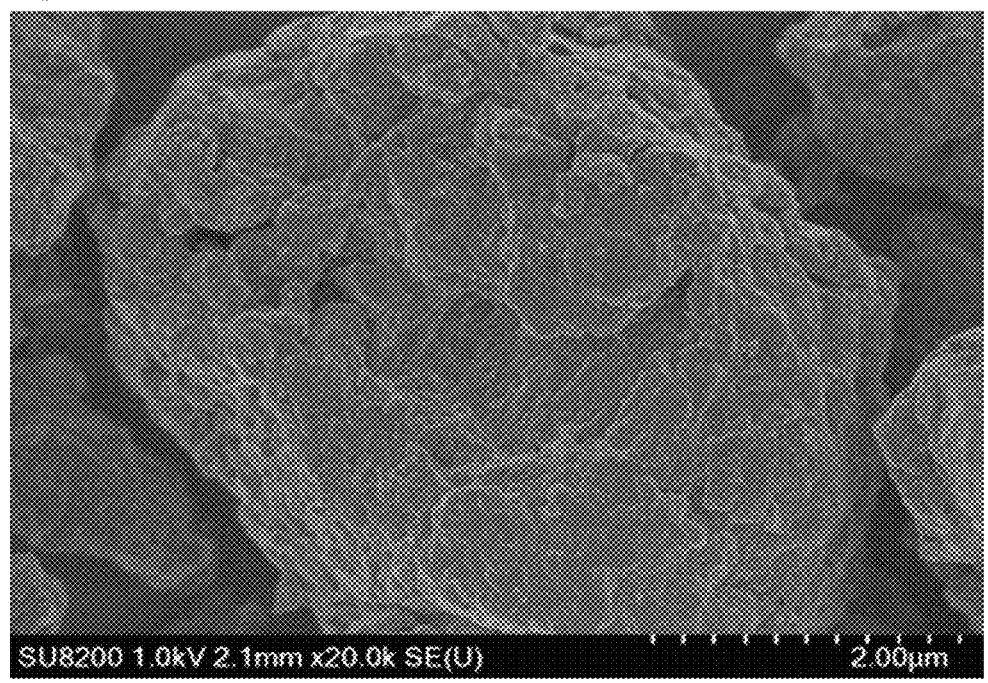
FIG. 9 is a photographed image by a scanning electron microscope (SEM) of a sulfide solid electrolyte obtained in Example 7.

FIG. 6 shows a relation between an average particle diameter and a specific surface area in the case of subjecting each of precursors for mechanical treatment of the present embodiment (Examples 1 to 20) to mechanical treatment. The numerical values in the figure express Examples 5 to 7, 10, and 11, respectively as described below. In addition, FIGS. 7 to 9 are each of photographed images by a scanning electron microscope (SEM) of sulfide solid electrolytes after mechanical treatment of precursors for mechanical treatment of Examples 5, 6, and 7, respectively.

According to conventional sulfide solid electrolytes, since the particle shape is not a true sphere, the relation between the particle diameter and the specific surface area is established within a range where though it does not coincide with a theoretical line, in general, it does not largely deviate from the theoretical line.

On the other hand, the precursor for mechanical treatment of the present embodiment has a morphology largely deviating from the theoretical line. This is because as shown in FIG. 7 (Example 5), the precursor for mechanical treatment has a structure composed of secondary particles resulting from aggregation of fine primary particles. According to this structure, when the mechanical treatment is performed with a relatively small energy, the average particle diameter becomes close to that of primary particles owing to disintegration of secondary particles as seen in from Example 5 to Example 6, and the specific surface area does not substantially change (see FIG. 8). Conversely, when the mechanical treatment is performed with a relatively large energy, the primary particles are gathered each other and granulated at the same time of disintegration of the secondary particles as shown in FIG. 9 (Example 7), whereby both the particle diameter and the specific surface area become small.

In addition, by adjusting the energy of the mechanical treatment, for example, it becomes possible to control the morphology such that after undergoing the disintegration of secondary particles, the granulation takes place as seen in from Example 10 to Example 11 (from disintegration with a low energy to granulation with a high energy).

In the light of the above, though as a matter of course, the sulfide solid electrolyte of the present embodiment can be used for a sulfide solid electrolyte as it stands, it may be considered that the sulfide solid electrolyte of the present embodiment becomes a precursor for mechanical treatment, which is suitably used for the mechanical treatment especially for the purpose of adjusting the morphology through the mechanical treatment. Then, by using, as the precursor for mechanical treatment, the sulfide solid electrolyte having properties of readily adjusting the morphology, it has become possible to easily separately make a positive electrode material, a negative electrode material, and a solid electrolyte to be used for the electrolyte of an all-solid-state lithium battery in which the morphology of the solid electrolyte, for example, a desirable optimum particle diameter, is different.

(Properties of Sulfide Solid Electrolyte)

The sulfide solid electrolyte of the present embodiment is one having a volume-based average particle diameter measured by laser diffraction particle size distribution measurement of 3 μm or more. From the viewpoint of easy adjustment of morphology, the average particle diameter is preferably 4 μm or more, more preferably 5 μm or more, and still more preferably 7 μm or more, and an upper limit thereof is preferably 150 μm or less, more preferably 125 μm or less, still more preferably 100 μm or less, and yet still more preferably 50 μm or less.

In this specification, the average particle diameter by laser diffraction particle size distribution measurement is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In this specification, the average particle diameter is also referred to as "average particle diameter ($D_{50}$)".

More specifically, the average particle diameter is, for example, measured in the following manner.

First of all, 110 mL of dehydrated toluene (manufactured by Wako Pure Chemical Industries, Ltd., a product name: Special Grade) is charged in a dispersing tank of a laser diffraction particle size distribution measuring device, and 6% of dehydrated tertiary butyl alcohol (manufactured by Wako Pure Chemical Industries, Ltd., Special Grade) as a dispersant is further added.

The aforementioned mixture is thoroughly mixed, to which is then added a dried sulfide solid electrolyte, and the particle diameter is measured. The addition amount of the dried sulfide solid electrolyte is adjusted and added such that the laser scattering intensity corresponding to the particle concentration in an operation screen in the measuring device falls within a prescribed range (10 to 20%). When the addition amount is more than this range, there is a concern that multiple scattering is generated, whereby the precise particle diameter distribution cannot be determined. In addition, when the addition amount is lower than this range, there is a concern that the SN ratio becomes worse, whereby the precise measurement cannot be achieved. The scattering intensity is indicated on a basis of the addition amount of the "dried sulfide solid electrolyte" according to a measuring device, and therefore, the addition amount at which the aforementioned laser scattering intensity falls within the aforementioned range may be found.

Although an optimum amount of the addition amount of the "dried sulfide solid electrolyte" varies with the kind and particle diameter, etc. of a metal salt, it is generally about 0.005 g to 0.05 g.

In addition, the sulfide solid electrolyte of the present embodiment is one having a specific surface area measured by the BET method of 20 m$^2$/g or more. From the viewpoint of easy adjustment of morphology, the specific surface area is preferably 21 m$^2$/g or more, more preferably 23 m$^2$/g or more, still more preferably 25 m$^2$/g or more, and yet still more preferably 27 m$^2$/g or more, and an upper limit thereof is preferably 70 m$^2$/g or less, more preferably 60 m$^2$/g or less, still more preferably 50 m$^2$/g or less, and yet still more preferably 35 m$^2$/g or less.

In this specification, the specific surface area is a value measured by the BET method (gas adsorption method), and as the gas, nitrogen may be used (nitrogen method), or krypton may be used (krypton method). The gas is appropriately selected according to the size of the specific surface area and provided for the measurement. The specific surface area can be, for example, measured using a commercially available device, such as a gas adsorption measuring device (for example, AUTOSORB 6 (manufactured by Sysmex Corporation)).

The sulfide solid electrolyte of the present embodiment contains at least a sulfur element and preferably contains a lithium element as an element for revealing the ionic conductivity, and from the viewpoint of enhancing the ionic conductivity, it preferably contains a phosphorus element and a halogen element.

The sulfide solid electrolyte of the present embodiment is preferably one containing a thio-LISICON Region II-type crystal structure. The "solid electrolyte" and "crystalline solid electrolyte" in this specification are mentioned later. When the present crystal structure is contained, the sulfide solid electrolyte of the present embodiment may become a solid electrolyte having a high ionic conductivity.

While a blending ratio of these various elements will be described in detail in the production method of a sulfide solid electrolyte (production method of a precursor for mechanical treatment) as mentioned later, a blending ratio (molar ratio) of lithium element to sulfur element to phosphorous element to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4).

In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the aforementioned range, it becomes easy to provide a solid electrolyte having a thio-LISICON Region II-type crystal structure and having a higher ionic conductivity.

[Production Method of Sulfide Solid Electrolyte]

Although a production method of the aforementioned sulfide solid electrolyte to be used as the precursor for mechanical treatment is not particularly restricted, from the viewpoint of obtaining not only the predetermined average particle diameter and specific surface area which the sulfide solid electrolyte of the present embodiment has but also a higher ionic conductivity, it is preferred to include mixing the raw material inclusion containing a lithium element, a sulfur element, a phosphorus element, and a halogen element with a complexing agent. In this specification, in order to distinguish the "production method of the aforementioned sulfide solid electrolyte to be used as the precursor for mechanical treatment" from a treatment method of the solid electrolyte of the present embodiment as mentioned later, it is sometimes referred to as simply as "production method of a precursor for mechanical treatment", "present production method", or the like.

The "solid electrolyte" as referred to in this specification means an electrolyte of keeping the solid state at 25° C. in a nitrogen atmosphere. The solid electrolyte in the present embodiment is a solid electrolyte containing a lithium element, a sulfur element, a phosphorus element, and a halogen element and having an ionic conductivity to be caused owing to the lithium element. In view of the fact that the solid electrolyte in the present embodiment contains the sulfur element, it is also referred to as "sulfide solid electrolyte".

In the "solid electrolyte", both of a crystalline solid electrolyte having a crystal structure and an amorphous solid electrolyte are included. The crystalline solid electrolyte as referred to in this specification is a material that is a solid electrolyte in which peaks derived from the solid electrolyte are observed in an X-ray diffraction pattern in the X-ray diffractometry, and the presence or absence of peaks derived from the raw materials of the solid electrolyte does not matter. That is, the crystalline solid electrolyte contains a crystal structure derived from the solid electrolyte, in which a part thereof may be a crystal structure derived from the solid electrolyte, or all of them may be a crystal structure derived from the solid electrolyte. The crystalline solid electrolyte may be one in which an amorphous solid electrolyte is contained in a part thereof so long as it has the X-ray diffraction pattern as mentioned above. In consequence, in the crystalline solid electrolyte, a so-called glass ceramics which is obtained by heating the amorphous solid electrolyte to a crystallization temperature or higher is contained.

The amorphous solid electrolyte as referred to in this specification is a halo pattern in which other peak than the peaks derived from the materials is not substantially observed in an X-ray diffraction pattern in the X-ray diffractometry, and it is meant that the presence or absence of peaks derived from the raw materials of the solid electrolyte does not matter.

In the production method of a precursor for mechanical treatment, there are included the following four embodiments depending upon whether or not a solid electrolyte, such as $Li_3PS_4$, is used as the raw material, and whether or not a solvent is used. Examples of preferred modes of these four embodiments are shown in FIG. 1 (Embodiments A and B) and FIG. 2 (Embodiments C and D). That is, in the present production method, there are preferably included a production method of using raw materials, such as lithium sulfide and diphosphorus pentasulfide, and a complexing agent (Embodiment A); a production method of containing, as raw materials, $Li_3PS_4$ that is an electrolyte main structure, and the like and using a complexing agent (Embodiment B); a production method of adding a solvent to the raw materials, such as lithium sulfide, and the complexing agent in the aforementioned Embodiment A (Embodiment C); and a production method of adding a solvent to the raw materials, such as $Li_3PS_4$, and the complexing agent in the aforementioned Embodiment B (Embodiment D).

The Embodiments A to D are hereunder described in order.

Embodiment A

As shown in FIG. 1, the Embodiment A is concerned with a mode in which in a production method including mixing a raw material inclusion containing a lithium element, a sulfur element, a phosphorus element, and a halogen element with a complexing agent, lithium sulfide and diphosphorus pentasulfide, and the like are used as the raw material inclusion. By mixing the raw material inclusion with the complexing agent, in general, an electrolyte precursor inclusion that is a suspension is obtained, and by drying it, the electrolyte precursor is obtained. Furthermore, by heating the electrolyte precursor, the crystalline solid electrolyte is obtained. In addition, while not illustrated, it is preferred that the before heating, the electrolyte precursor is pulverized, and an electrolyte precursor pulverized product obtained through pulverization is heated. That is, the present production method preferably includes mixing; pulverization of the electrolyte precursor obtained through mixing; and heating of the electrolyte precursor pulverized product obtained through pulverization. While the description is hereunder made beginning from Embodiment A, one described with the wordings "of the present embodiment" is a matter applicable even in other embodiments.

(Raw Material Inclusion)

The raw material inclusion which is used in the present embodiment is one containing a lithium element, a sulfur element, a phosphorus element, and a halogen element.

As the raw materials to be contained in the raw material inclusion, for example, a compound containing at least one of a lithium element, a sulfur element, a phosphorus element, and a halogen element can be used. More specifically, representative examples of the foregoing compound include raw materials composed of at least two elements selected from the aforementioned four elements, such as lithium sulfide; lithium halides, e.g., lithium fluoride, lithium chloride, lithium bromide, and lithium iodide; phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), with bromine ($Br_2$) and iodine ($I_2$) being preferred.

As materials which may be used as the raw material other than those mentioned above, a compound containing not only at least one element selected from the aforementioned four elements but also other element than the foregoing four elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halogen, an antimony halide, a tellurium halide, and a bismuth halide; and phosphorus oxyhalides, such as phosphorus oxychloride ($POCl_3$) and phosphorus oxybromide ($POBr_3$).

In the Embodiment A, among them, phosphorus sulfides, such as lithium sulfide, diphosphorus trifluoride ($P_2S_3$), and diphosphorus pentasulfide ($P_2S_5$); halogen simple substances, such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred as the raw material from the viewpoint of more easily obtaining a solid electrolyte having not only predetermined average particle diameter and specific surface area but also a high ionic conductivity. Preferred examples of a combination of raw materials include a combination of lithium sulfide, diphosphorus pentasulfide, and a lithium halide; and a combination of lithium sulfide, phosphorus pentasulfide, and a halogen simple substance, in which the lithium halide is preferably lithium bromide or lithium iodide, and the halogen simple substance is preferably bromine or iodine.

The lithium sulfide which is used in the Embodiment A is preferably a particle.

An average particle diameter ($D_{50}$) of the lithium sulfide particle is preferably 10 μm or more and 2,000 μm or less, more preferably 30 μm or more and 1,500 μm or less, and still more preferably 50 μm or more and 1,000 μm or less. Among the above-exemplified raw materials, the solid raw material is preferably one having an average particle diameter of the same degree as in the aforementioned lithium sulfide particle, namely one having an average particle diameter falling within the same range as in the aforementioned lithium sulfide particle is preferred.

In the case of using lithium sulfide, diphosphorus pentasulfide, and the lithium halide as the raw materials, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 76 mol %.

In the case of using lithium sulfide, diphosphorus pentasulfide, a lithium halide, and other raw material to be optionally used, the content of lithium sulfide and diphosphorus pentasulfide relative to the total of the aforementioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the case of using not only a halogen simple substance but also lithium sulfide and diphosphorus pentasulfide as the raw materials, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and even yet still more preferably within a range of 73 to 77%. This is because when the foregoing proportion falls within the aforementioned ranges, a higher ionic conductivity is obtained. In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus pentasulfide, a halogen simple substance, and a lithium halide, the content (α mol %) of the halogen simple substance and the content (β mol %) of the lithium halide relative to the total of the aforementioned raw materials preferably satisfy the following expression (2), more preferably satisfy the following expression (3), still more preferably satisfy the following expression (4), and yet still more preferably satisfy the following expression (5).

$$2 \leq (2\alpha+\beta) \leq 100 \qquad (2)$$

$$4 \leq (2\alpha+\beta) \leq 80 \qquad (3)$$

$$6 \leq (2\alpha+\beta) \leq 50 \qquad (4)$$

$$6 \leq (2\alpha+\beta) \leq 30 \qquad (5)$$

In the case of using two halogen simple substances, when the molar number in the substance of the halogen element of one side is designated as A1, and the molar number in the substance of the halogen element of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is designated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

(Complexing Agent)

In the present embodiment, a complexing agent is used. The complexing agent as referred to in this specification is a substance capable of forming a complex together with the lithium element and means one having such properties of acting with the lithium element-containing sulfide and the halide, and the like contained in the aforementioned raw materials, thereby promoting formation of the electrolyte precursor.

As the complexing agent, any material can be used without being particularly restricted so long as it has the aforementioned properties. In particular, elements having a high affinity with the lithium element, for example, compounds containing a hetero element, such as a nitrogen element, an oxygen element, and a chlorine element, are preferably exemplified, and compounds having a group containing such a hetero element are more preferably exemplified. This is because such a hetero element and the group containing the foregoing hetero element may be coordinated (bound) with lithium.

It may be considered that with respect to the complexing agent, the hetero element in the molecule thereof has a high affinity with the lithium element, and the complexing agent has such properties of binding with the lithium-containing structure which is existent as a main structure in the solid electrolyte obtained by the present production method, such as $Li_3PS_4$ containing representatively a $PS_4$ structure, and the lithium-containing raw materials, such as a lithium halide, thereby easily forming an aggregate. For that reason, since by mixing the aforementioned raw material inclusion and the complexing agent, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen element is more likely dispersed and fixed is obtained, as a result, it may be considered that a solid electrolyte having a high ionic conductivity, in which the generation of hydrogen sulfide is suppressed, is obtained. In addition, it may be considered that the predetermined average particle diameter and specific surface area are readily obtained.

In consequence, the complexing agent preferably has at least two hetero elements capable of being coordinated (bound) therewith in the molecule, and more preferably has at least two hetero element-containing groups in the molecule. In view of the fact that the complexing agent has at least two hetero element-containing groups in the molecule, the lithium-containing structure, such as $Li_3PS_4$ containing a $PS_4$ structure, and the lithium-containing raw material, such as a lithium halide, can be bound with each other via the at least two hetero elements in the molecule, the halogen element is more likely dispersed and fixed in the electrolyte precursor. As a result, a solid electrolyte having not only predetermined average particle diameter and specific surface area but also a high ionic conductivity, in which the generation of hydrogen sulfide is suppressed, is obtained. In addition, among the hetero elements, a nitrogen element is preferred, and an amino group is preferred as the group containing a nitrogen element, namely the complexing agent is preferably an amine compound.

The amine compound is not particularly restricted so long as it has an amino group in the molecule because it may promote formation of the electrolyte precursor. However, a compound having at least two amino groups in the molecule is preferred. In view of the fact that the complexing agent has such a structure, the lithium-containing structure, such as $Li_3PS_4$ containing a $PS_4$ structure and the lithium-containing raw material, such as a lithium halide, can be bound with each other via at least two nitrogen elements in the molecule, the halogen element is more likely dispersed and fixed in the electrolyte precursor. As a result, a solid electrolyte having not only predetermined average particle diameter and specific surface area but also a high ionic conductivity is obtained.

Examples of such an amine compound include amine compounds, such as aliphatic amines, alicyclic amines, heterocyclic amines, and aromatic amines, and these amine compounds can be used alone or in combination of plural kinds thereof.

More specifically, as the aliphatic amine, aliphatic primary diamines, such as ethylenediamine, diaminopropane, and diaminobutane; aliphatic secondary diamines, such as N,N'-dimethylethylenediamine, N,N'-diethylethylenediamine, N,N'-dimethyldiaminopropane, and N,N'-diethyldiaminopropane; and aliphatic tertiary diamines, such as N,N,N',N'-tetramethyldiaminomethane, N,N,N',N'-tetramethylethylenediamine, N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane, are representatively preferably exemplified. Here, in the exemplification in this specification, for example, when the diaminobutane is concerned, it should be construed that all of isomers inclusive of not only isomers regarding the position of the amino group, such as 1,2-diaminobutane, 1,3-diaminobutane, and 1,4-diaminobutane, but also linear or branched isomers and so on regarding the butane are included unless otherwise noted.

The carbon number of the aliphatic amine is preferably 2 or more, more preferably 4 or more, and still more preferably 6 or more, and an upper limit thereof is preferably 10 or less, more preferably 8 or less, and still more preferably 7 or less. In addition, the carbon number of the hydrocarbon group of the aliphatic hydrocarbon group in the aliphatic amine is preferably 2 or more, and an upper limit thereof is preferably 6 or less, more preferably 4 or less, and still more preferably 3 or less.

As the alicyclic amine, alicyclic primary diamines, such as cyclopropanediamine and cyclohexanediamine; alicyclic secondary diamines, such as bisaminomethylcyclohexane; and alicyclic tertiary diamines, such as N,N,N',N'-tetramethyl-cyclohexanediamine and bis(ethylmethylamino)cyclohexane, are representatively preferably exemplified. As the heterocyclic diamine, heterocyclic primary diamines, such as isophoronediamine; heterocyclic secondary diamines, such as piperazine and dipiperidylpropane; and heterocyclic tertiary diamines, such as N,N-dimethylpiperazine and bis-methylpiperidylpropane, are representatively preferably exemplified.

The carbon number of each of the alicyclic amine and the heterocyclic amine is preferably 3 or more, and more preferably 4 or more, and an upper limit thereof is preferably 16 or less, and more preferably 14 or less.

As the aromatic amine, aromatic primary diamines, phenyldiamine, tolylenediamine, and naphthalenediamine; aromatic secondary diamines, such as N-methylphenylenediamine, N,N'-dimethylphenylenediamine, N,N'-bismethylphenylphenylenediamine, N,N'-dimethylnaphthalenediamine, and N-naphthylethylenediamine; and aromatic tertiary diamines, such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine, are representatively preferably exemplified.

The carbon number of the aromatic amine is preferably 6 or more, more preferably 7 or more, and still more preferably 8 or more, and an upper limit thereof is preferably 16 or less, more preferably 14 or less, and still more preferably 12 or less.

The amine compound which is used in the present embodiment may also be one substituted with a substituent, such as an alkyl group, an alkenyl group, an alkoxy group, a hydroxy group, and a cyano group, or a halogen atom.

While the diamines have been exemplified as specific examples, needless to say, the amine compound which may be used in the present embodiment is not limited to the diamines. Examples thereof include trimethylamine, triethylamine, ethyldimethylamine, aliphatic monoamines corresponding to various diamines, such as the aforementioned aliphatic diamines, piperidine compounds, such as piperidine, methylpiperidine, and tetramethylpiperidine, pyridine compounds, such as pyridine and picoline, morpholine compound, such as morpholine, methylmorpholine, and thiomorpholine, imidazole compounds, such as imidazole and methylimidazole, alicyclic monoamines, such as monoamines corresponding to the aforementioned alicyclic diamines, and monoamines, such as aromatic monoamines corresponding to the aforementioned aromatic diamines. Besides, for example, polyamines having three or more amino groups, such as diethylenetriamine, N,N',N"-trimethyl diethylenetriamine, N,N,N',N",N"-pentamethyldiethylenetriamine, triethylenetetramine, N,N'-bis[(dimethyl-amino)ethyl]-N,N'-dimethylethylenediamine, hexamethylenetetramine, and tetraethylenepentamine, can also be used.

Among those described above, from the viewpoint of obtaining not only predetermined average particle diameter and specific surface area but also a high ionic conductivity, a tertiary amines having a tertiary amino group as the amino group are preferred, tertiary diamines having two tertiary amino groups are more preferred, tertiary diamines having two tertiary amino groups on the both ends are still more preferred, and aliphatic tertiary diamines having a tertiary amino group on the both ends are yet still more preferred. In the aforementioned amine compounds, as the aliphatic tertiary diamine having a tertiary amino group on the both ends, tetramethylethylenediamine, tetraethylethylenediamine, tetramethyldiaminopropane, and tetraethyldiaminopropane are preferred, and taking into account easiness of availability and so on, tetramethylethylenediamine and tetramethyldiaminopropane are preferred.

As other complexing agent than the amine compound, for example, a compound having a group containing a hetero element, such as a halogen element, e.g., an oxygen element and a chlorine element, is high in an affinity with the lithium element, and such a compound is exemplified as the other complexing agent than the amine compound. In addition, a compound having a group containing, as the hetero element, a nitrogen element other than the amino group, for example, a nitro group and an amide group, provides the same effects.

Examples of the other complexing agent include alcohol-based solvents, such as ethanol and butanol; ester-based solvents, such as ethyl acetate and butyl acetate; aldehyde-based solvents, such as formaldehyde, acetaldehyde, and dimethylformamide; ketone-based solvents, such as acetone and methyl ethyl ketone; ether-based solvents, such as diethyl ether, diisopropyl ether, dibutyl ether, tetrahydrofuran, dimethoxyethane, cyclopentyl methyl ether, tert-butyl methyl ether, and anisole; halogen element-containing aromatic hydrocarbon solvents, such as trifluoromethylbenzene, nitrobenzene, chlorobenzene, chlorotoluene, and bromobenzene; and solvents containing a carbon atom and a hetero atom, such as acetonitrile, dimethyl sulfoxide, and carbon disulfide. Of these, ether-based solvents are preferred; diethyl ether, diisopropyl ether, dibutyl ether, and tetrahydrofuran are more preferred; and diethyl ether, diisopropyl ether, and dibutyl ether are still more preferred.

(Mixing)

As shown in the flow chart of FIG. 1, the raw material inclusion and the complexing agent are mixed. In the present embodiment, though a mode of mixing the raw material inclusion and the complexing agent may be in any of a solid state and a liquid state, in general, the raw material inclusion contains a solid, whereas the complexing agent is in a liquid state, and therefore, in general, mixing is made in a mode in which the solid raw material inclusion is existent in the liquid complexing agent.

The content of the raw material inclusion is preferably 5 g or more, more preferably 10 g or more, still more preferably 30 g or more, and yet still more preferably 50 g or more relative to the amount of one liter of the complexing agent, and an upper limit thereof is preferably 500 g or less, more preferably 400 g or less, still more preferably 300 g or less, and yet still more preferably 250 g of less. When the content of the raw material inclusion falls within the aforementioned range, the raw material inclusion is readily mixed, the dispersing state of the raw materials is enhanced, and the reaction among the raw materials is promoted, and therefore, the electrolyte precursor and further the solid electrolyte are readily efficiently obtained.

A method for mixing the raw material inclusion and the complexing agent is not particularly restricted, and the raw materials contained in the raw material inclusion and the complexing agent may be charged in an apparatus capable of mixing the raw material inclusion and the complexing agent and mixed. For example, by feeding the complexing agent into a tank, actuating an impeller, and then gradually adding the raw materials, a favorable mixing state of the raw material inclusion is obtained, and dispersibility of the raw materials is enhanced, and thus, such is preferred.

In the case of using a halogen simple substance as the raw material, there is a case where the raw material is not a solid. Specifically, fluorine and chlorine are a gas, and bromine is a liquid under normal temperature and normal pressure. For example, in the case where the raw material is a liquid, it may be fed into the tank separately from the other raw materials together with the complexing agent, and in the case where the raw material is a gas, the raw material may be fed such that it is blown into the complexing agent having the solid raw materials added thereto.

The present embodiment is characterized by including mixing the raw material inclusion and the complexing agent, and the electrolyte precursor can also be produced by a method not using an instrument to be used for the purpose of pulverization of solid raw materials, which is generally called a pulverizer, such as a medium type pulverizer, e.g., a ball mill and a bead mill. According to the present production method, by merely mixing the raw material inclusion and the complexing agent, the raw materials and the complexing agent contained in the inclusion are mixed, whereby the electrolyte precursor can be formed. In view of the fact that a mixing time for obtaining the electrolyte precursor can be shortened, or atomization can be performed, the mixture of the raw material inclusion and the complexing agent may be pulverized by a pulverizer.

Examples of an apparatus for mixing the raw material inclusion and the complexing agent include a mechanical agitation type mixer having an impeller provided in a tank. Examples of the mechanical agitation type mixer include a high-speed agitation type mixer and a double arm type mixer, and a high-speed agitation type mixer is preferably used from the viewpoint of increasing the homogeneity of raw materials in the mixture of the raw material inclusion and the complexing agent and obtaining not only predetermined average particle diameter and specific surface area but also a high ionic conductivity. In addition, examples of the high-speed agitation type mixer include a vertical axis rotating type mixer and a lateral axis rotating type mixer, and mixers of any of these types may be used.

Examples of a shape of the impeller which is used in the mechanical agitation type mixer include a blade type, an arm type, a ribbon type, a multistage blade type, a double arm type, a shovel type, a twin-shaft blade type, a flat blade type, and a C type blade type. From the viewpoint of increasing the homogeneity of raw materials in the raw material inclusion and obtaining not only predetermined average particle diameter and specific surface area but also a high ionic conductivity, a shovel type, a flat blade type, a C type blade type, and the like are preferred.

A temperature condition on the occasion of mixing the raw material inclusion and the complexing agent is not particularly limited, and for example, it is −30 to 100° C., preferably −10 to 50° C., and more preferably around room temperature (23° C.) (for example, (room temperature) ±about 5° C.). In addition, a mixing time is about 0.1 to 150 hours, and from the viewpoint of more uniformly mixing the raw material inclusion and the complexing agent, thereby obtaining not only predetermined average particle diameter and specific surface area but also a high ionic conductivity, the mixing time is preferably 1 to 120 hours, more preferably 4 to 100 hours, and still more preferably 8 to 80 hours.

By mixing the raw material inclusion and the complexing agent, owing to an action of the lithium element, the sulfur element, the phosphorus element, and the halogen element, all of which are contained in the raw materials, with the complexing agent, an electrolyte precursor in which these elements are bound directly with each other via and/or not via the complexing agent is obtained. That is, in the present production method, the electrolyte precursor obtained through mixing of the raw material inclusion and the complexing agent is constituted of the complexing agent, the lithium element, the sulfur element, the phosphorus element, and the halogen element, and by mixing the raw material inclusion and the complexing agent, a material containing the electrolyte precursor (hereinafter sometimes referred to as "electrolyte precursor inclusion") is obtained. In the present embodiment, the resulting electrolyte precursor is not one completely dissolved in the complexing agent that is a liquid, and typically, a suspension containing the electrolyte precursor that is a solid is obtained. In consequence, the present production method is corresponding to a heterogeneous system in a so-called liquid-phase method.

(Pulverization)

The present production method preferably includes pulverization of the electrolyte precursor. By pulverizing the electrolyte precursor, a solid electrolyte having a small particle diameter is obtained. In addition, the reduction of the ionic conductivity can be suppressed.

The pulverization of the electrolyte precursor is different from mechanical milling that is a so-called solid-phase method and is not one for obtaining an amorphous or crystalline solid electrolyte owing to a mechanical stress. As mentioned above, the electrolyte precursor contains the complexing agent, and the lithium-containing structure, such as a $PS_4$ structure, and the raw materials containing lithium, such as a lithium halide, are bound (coordinated) with each other via the complexing agent. Then, it may be considered that when the electrolyte precursor is pulverized, fine particles of the electrolyte precursor are obtained while maintaining the aforementioned binding (coordination) and dispersing state. By subjecting this electrolyte precursor to heating as mentioned later, the components bound (coordinated) via the complexing agent are linked with each other at the same time of removal of the complexing agent, and the reaction with the crystalline sulfide solid electrolyte easily takes place. For that reason, growth of large particles owing to aggregation of particles with each other as seen in usual synthesis of a solid electrolyte is hardly generated, and atomization can be readily achieved.

The pulverizer which is used for pulverization of the electrolyte precursor is not particularly restricted so long as it is able to pulverize the particles, and for example, a medium type pulverizer using a pulverization medium can be used. Among medium type pulverizers, taking into account the fact that the electrolyte precursor is in a liquid state or slurry state mainly accompanied by liquids, such as the complexing agent and the solvent, a wet-type pulverizer capable of coping with wet pulverization is preferred.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

The electrolyte precursor to be pulverized by the pulverizer is typically fed as the electrolyte precursor inclusion which is obtained by mixing the raw material inclusion and the complexing agent and mainly fed in a liquid state or slurry state. That is, an object to be pulverized by the pulverizer mainly becomes an electrolyte precursor inclusion liquid or an electrolyte precursor-containing slurry. Accordingly, the pulverizer which is used in the present embodiment is preferably a flow type pulverizer capable of being optionally subjected to circulation driving of the electrolyte precursor inclusion liquid or electrolyte precursor-containing slurry. More specifically, it is preferred to use a pulverizer of a mode of circulating the electrolyte precursor inclusion liquid or electrolyte precursor-containing slurry between a pulverizer (pulverization mixer) of pulverizing the slurry and a temperature-holding tank (reactor) as disclosed in JP 2010-140893 A.

The size of the bead which is used for the pulverizer may be appropriately selected according to the desired particle diameter and treatment amount and the like, and for example, it may be about 0.05 mmφ or more and 5.0 mmφ or less, and it is preferably 0.1 mmφ or more and 3.0 mmφ or less, and more preferably 0.3 mmφ or more and 1.5 mmφ or less in terms of a diameter of the bead.

As the pulverizer which is used for pulverization of the electrolyte precursor, a machine capable of pulverizing an object using ultrasonic waves, for example, a machine called an ultrasonic pulverizer, an ultrasonic homogenizer, a probe ultrasonic pulverizer, or the like, can be used.

In this case, various conditions, such as a frequency of ultrasonic waves, may be appropriately selected according to the desired average particle diameter of the electrolyte precursor, and the like. The frequency may be, for example, about 1 kHz or more and 100 kHz or less, and from the viewpoint of more efficiently pulverizing the electrolyte precursor, it is preferably 3 kHz or more and 50 kHz or less, more preferably 5 kHz or more and 40 kHz or less, and still more preferably 10 kHz or more and 30 kHz or less.

An output which the ultrasonic pulverizer has may be typically about 500 to 16,000 W, and it is preferably 600 to 10,000 W, more preferably 750 to 5,000 W, and still more preferably 900 to 1,500 W.

Although an average particle diameter ($D_{50}$) of the electrolyte precursor which is obtained through pulverization is appropriately determined according to the desire, it is typically 0.01 μm or more and 50 μm or less, preferably 0.03 μm or more and 5 μm or less, more preferably 0.05 μm or more and 3 μm or less. By taking such an average particle diameter, it becomes possible to cope with the desire of the solid electrolyte having a small particle diameter as 1 μm or less in terms of an average particle diameter.

A time for pulverization is not particularly restricted so long as it is a time such that the electrolyte precursor has the desired average particle diameter, and it is typically 0.1 hours or more and 100 hours or less. From the viewpoint of efficiently regulating the particle diameter to the desired size, the time for pulverization is preferably 0.3 hours or more and 72 hours or less, more preferably 0.5 hours or more and 48 hours or less, and still more preferably 1 hour or more and 24 hours or less.

The pulverization may be performed after drying the electrolyte precursor inclusion, such as the electrolyte precursor inclusion liquid or electrolyte precursor-containing slurry, to form the electrolyte precursor as a powder.

In this case, among the aforementioned pulverizers as exemplified as the pulverizer which may be used in the present production method, any one of the dry-type pulverizers is preferably used. Besides, the items regarding the pulverization, such as a pulverization condition, are the same as those in the pulverization of the electrolyte precursor inclusion liquid or electrolyte precursor-containing slurry, and the average particle diameter of the electrolyte precursor obtained through pulverization is also the same as that as mentioned above.

(Drying)

The present production method may include drying of the electrolyte precursor inclusion (typically, suspension). According to this, a powder of the electrolyte precursor is obtained. By performing drying in advance, it becomes possible to efficiently perform heating. The drying and the subsequent heating may be performed in the same process.

The electrolyte precursor inclusion can be dried at a temperature according to the kind of the remaining complexing agent (complexing agent not incorporated into the electrolyte precursor). For example, the drying can be performed at a temperature of a boiling point of the complexing agent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature)±about 5° C.), to volatilize the complexing agent.

The drying may be performed by subjecting the electrolyte precursor inclusion to solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the electrolyte precursor inclusion is transferred into a container, and after the electrolyte precursor is precipitated, the complexing agent and solvent as a supernatant are removed, or filtration with a glass filter having a pore size of, for example, about 10 to 200 and preferably 20 to 150 is easy.

Figure 3:
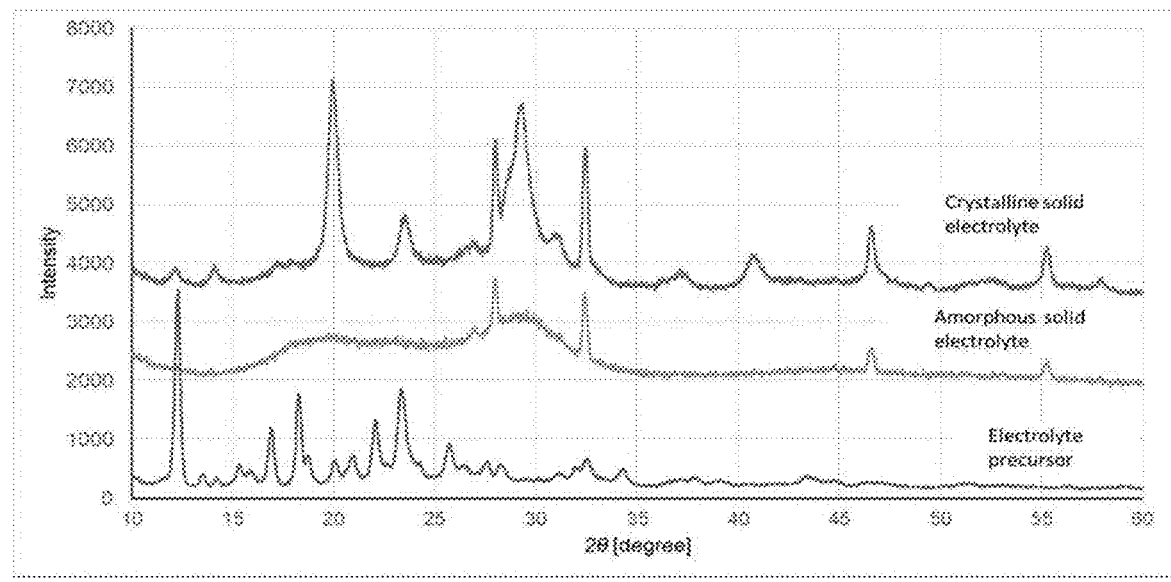
FIG. 3 is an X-ray diffraction spectrum of each of an electrolyte precursor, an amorphous solid electrolyte, and a crystalline solid electrolyte obtained in Example 1.
Figure 4:
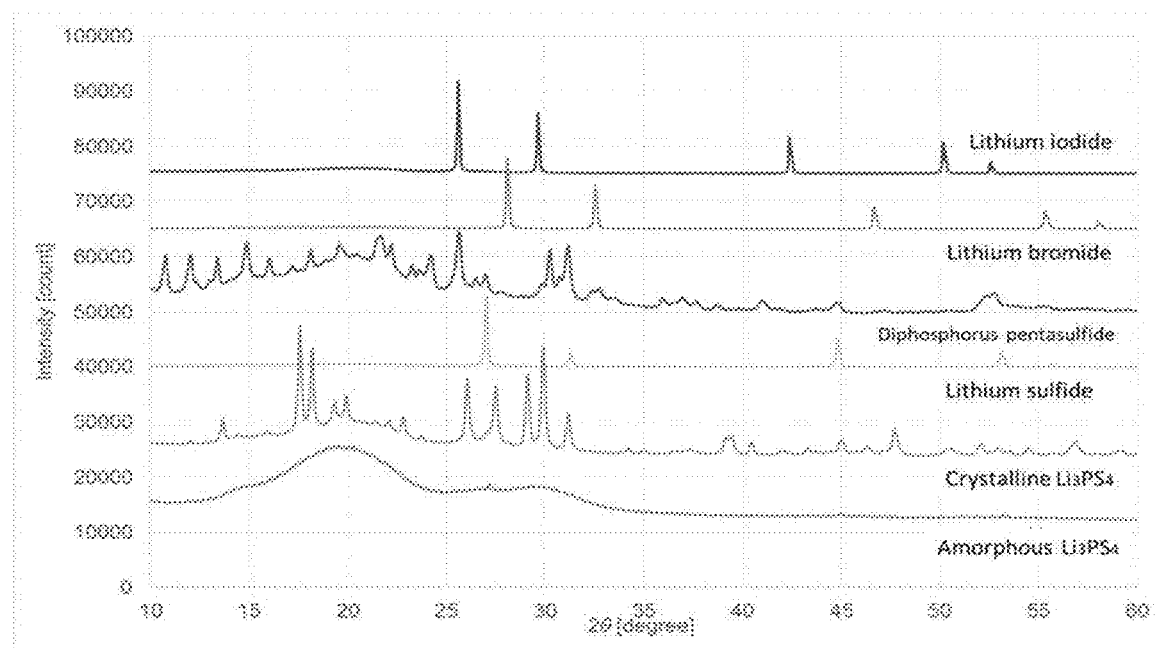
FIG. 4 is an X-ray diffraction spectrum of each of raw materials used in Examples.

The electrolyte precursor has such a characteristic feature that it is constituted of the complexing agent, the lithium element, the sulfur element, the phosphorus element, and the halogen element, and in the X-ray diffraction pattern in the X-ray diffractometry, peaks different from the peaks derived from the raw materials are observed, and it preferably contains a co-crystal constituted of the complexing agent, the lithium element, the sulfur element, the phosphorus element, and the halogen element. When only the raw material inclusion is merely mixed, the peaks derived from the raw materials are merely observed, whereas when the raw material inclusion and the complexing agent are mixed, peaks different from the peaks derived from the raw materials are observed. Thus, the electrolyte precursor (co-crystal) has a structure explicitly different from the raw materials themselves contained in the raw material inclusion. This matter is specifically confirmed in the section of Examples. Measurement examples of the X-ray diffraction patterns of the electrolyte precursor (co-crystal) and the respective raw materials, such as lithium sulfide, are shown in FIGS. 3 and 4, respectively. It is noted from the X-ray diffraction patterns that the electrolyte precursor (co-crystal) has a predetermined crystal structure. In addition, the diffraction pattern of the electrolyte precursor does not contain the diffraction patterns of any raw materials, such as lithium sulfide, as shown in FIG. 4, and thus, it is noted that the electrolyte precursor (co-crystal) has a crystal structure different from the raw materials.

In addition, the electrolyte precursor (co-crystal) has such a characteristic feature that it has a structure different from the crystalline solid electrolyte. This matter is also specifically confirmed in the section of Examples. The X-ray diffraction pattern of the crystalline solid electrolyte is also shown in FIG. 4, and it is noted that the foregoing diffraction pattern is different from the diffraction pattern of the electrolyte precursor (co-crystal). The electrolyte precursor (co-crystal) has the predetermined crystal structure and is also different from the amorphous solid electrolyte having a broad pattern as shown in FIG. 4.

The co-crystal is constituted of the complexing agent, the lithium element, the sulfur element, the phosphorus element, and the halogen element, and typically, it may be presumed that a complex structure in which the lithium element and the other elements are bound directly with each other via and/or not via the complexing agent is formed.

Here, the fact that the complexing agent constitutes the co-crystal can be, for example, confirmed through gas chromatography analysis. Specifically, the complexing agent contained in the co-crystal can be quantitated by dissolving a powder of the electrolyte precursor in methanol and subjecting the obtained methanol solution to gas chromatography analysis.

Although the content of the complexing agent in the electrolyte precursor varies with the molecular weight of the complexing agent, it is typically about 10% by mass or more and 70% by mass or less, and preferably 15% by mass or more and 65% by mass or less.

In the present production method, what the co-crystal containing the halogen element is formed is preferred from the standpoint of enhancing not only predetermined average particle diameter and specific surface area but also a high ionic conductivity. By using the complexing agent, the lithium-containing structure, such as a $PS_4$ structure, and the lithium-containing raw materials, such as a lithium halide, are bound (coordinated) with each other via the complexing agent, the co-crystal in which the halogen element is more likely dispersed and fixed is readily obtained, and not only the predetermined average particle diameter and specific surface area but also the ionic conductivity is enhanced.

The matter that the halogen element in the electrolyte precursor constitutes the co-crystal can be confirmed from the fact that even when the solid-liquid separation of the electrolyte precursor inclusion is performed, the predetermined amount of the halogen element is contained in the electrolyte precursor. This is because the halogen element which does not constitute the co-crystal is easily eluted as compared with the halogen element constituting the co-crystal and discharged into the liquid of solid-liquid separation. In addition, the foregoing matter can also be confirmed from the fact that by performing composition analysis through ICP analysis (inductively coupled plasma atomic emission spectrophotometry) of the electrolyte precursor or solid electrolyte, a proportion of the halogen element in the electrolyte precursor or solid electrolyte is not remarkably lowered as compared with a proportion of the halogen element fed from the raw materials.

The amount of the halogen element remaining in the electrolyte precursor is preferably 30% by mass or more, more preferably 35% by mass or more, and still more preferably 40% by mass or more relative to the charged composition. An upper limit of the amount of the halogen element remaining in the electrolyte precursor is 100% by mass.

(Heating)

It is preferred that the present production method includes heating of the electrolyte precursor to obtain the amorphous solid electrolyte; and heating of the electrolyte precursor or amorphous solid electrolyte to obtain the crystalline solid electrolyte. In view of the fact that heating of the electrolyte precursor is included, the complexing agent in the electrolyte precursor is removed, and the amorphous solid electrolyte and the crystalline solid electrolyte each containing the lithium element, the sulfur element, the phosphorus element, and the halogen element are obtained. In addition, the electrolyte precursor to be heated by the present heating may be an electrolyte precursor pulverized product which has been pulverized through the aforementioned pulverization.

Here, the fact that the complexing agent in the electrolyte precursor is removed is supported by the facts that in addition to the fact that it is evident from the results of the X-ray diffraction pattern, the gas chromatography analysis, and the like that the complexing agent constitutes the co-crystal of the electrolyte precursor, the solid electrolyte obtained by removing the complexing agent through heating of the electrolyte precursor is identical in the X-ray diffraction pattern with the solid electrolyte obtained by the conventional method without using the complexing agent.

In the present production method, the solid electrolyte is obtained by heating the electrolyte precursor to remove the complexing agent in the electrolyte precursor, and it is preferred that the content of the complexing agent in the solid electrolyte is low as far as possible. However, the complexing agent may be contained to an extent that the performance of the solid electrolyte is not impaired. The content of the complexing agent in the solid electrolyte may be typically 10% by mass or less, and it is preferably 5% by mass or less, more preferably 3% by mass or less, and still more preferably 1% by mass or less.

In the present production method, in order to obtain the crystalline solid electrolyte, it may be obtained by heating the electrolyte precursor, or it may be obtained by heating the electrolyte precursor to obtain the amorphous solid electrolyte and then heating the amorphous solid electrolyte. That is, in the present production method, the amorphous solid electrolyte can also be produced.

Conventionally, in order to obtain a crystalline solid electrolyte having a high ionic conductivity, for example, a solid electrolyte having a thio-LISICON Region II-type crystal structure as mentioned later, it was required that an amorphous solid electrolyte is prepared through mechanical pulverization treatment, such as mechanical milling, or other melt quenching treatment or the like, and then, the amorphous solid electrolyte is heated. But, it may be said that the present production method is superior to the conventional production method by mechanical milling treatment or the like from the standpoint that a crystalline solid electrolyte having a thio-LISICON Region II-type crystal structure is obtained even by a method of not performing mechanical pulverization treatment, other melt quenching treatment, or the like.

In the present production method, whether or not the amorphous solid electrolyte is obtained, whether or not the crystalline solid electrolyte is obtained, whether or not after obtaining the amorphous solid electrolyte, the crystalline solid electrolyte is obtained, or whether or not the crystalline solid electrolyte is obtained directly from the electrolyte precursor is appropriately selected according to the desire, and is able to be adjusted by the heating temperature, the heating time, or the like.

For example, in the case of obtaining the amorphous solid electrolyte, the heating temperature of the electrolyte precursor may be determined according to the structure of the crystalline solid electrolyte which is obtained by heating the amorphous solid electrolyte (or the electrolyte precursor). Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher. By regulating the heating temperature to such a temperature range, the amorphous solid electrolyte is obtained more efficiently and surely. Although the heating temperature for obtaining the amorphous solid electrolyte cannot be unequivocally prescribed because it varies with the structure of the resulting crystalline solid electrolyte, in general, it is preferably 135° C. or lower, more preferably 130° C. or lower, and still more preferably 125° C. or lower. Although a lower limit of the heating temperature is not particularly limited, it is preferably 90° C. or higher, more preferably 100° C. or higher, and still more preferably 110° C. or higher.

In the case of obtaining the crystalline solid electrolyte by heating the amorphous solid electrolyte or directly from the electrolyte precursor, the heating temperature may be determined according to the structure of the crystalline solid electrolyte, and it is preferably higher than the aforementioned heating temperature for obtaining the amorphous solid electrolyte. Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline solid electrolyte is obtained more efficiently and surely. Although the heating temperature for obtaining the crystalline solid electrolyte cannot be unequivocally prescribed because it varies with the structure of the resulting crystalline solid electrolyte, in general, it is preferably 130° C. or higher, more preferably 135° C. or higher, and still more preferably 140° C. or lower. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous solid electrolyte or crystalline solid electrolyte is obtained, for example, it is preferably 1 minute or more, more preferably 10 minutes or more, still more preferably 30 minutes or more, and yet still more preferably 1 hour or more. In addition, though an upper limit of the heating temperature is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuo). This is because deterioration (for example, oxidation) of the crystalline solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism, or the like may be selected according to the heating treatment amount.

(Amorphous Solid Electrolyte)

The amorphous solid electrolyte which is obtained by the present production method contains the lithium element, the sulfur element, the phosphorus element, and the halogen element. As representative examples thereof, there are preferably exemplified solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and solid electrolytes further containing other element, such as an oxygen element and a silicon element, for example, $Li_2S$—$P_2S_5$—$Li_2O$—LiI and $Li_2S$—$SiS_2$—$P_2S_5$—LiI. From the viewpoint of obtaining a higher ionic conductivity, solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferred.

The kinds of the elements constituting the amorphous solid electrolyte can be confirmed by, for example, an inductivity coupled plasma optical emission spectrometer (ICP).

In the case where the amorphous solid electrolyte obtained in the present production method is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous solid electrolyte obtained in the present production method is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous solid electrolyte obtained in the present production method, a blending ratio (molar ratio) of lithium element to sulfur element to phosphorous element to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the aforementioned range, it becomes easy to provide a solid electrolyte having a thio-LISICON Region II-type crystal structure as mentioned later and having a higher ionic conductivity.

Although the shape of the amorphous solid electrolyte is not particularly restricted, examples thereof include a granular shape. The average particle diameter ($D_{50}$) of the granular amorphous solid electrolyte is, for example, within a range of 0.01 to 500 µm, and 0.1 to 200 µm.

A volume-based average particle diameter of the amorphous solid electrolyte obtained by the present production method is 3 µm or more, a value of which is the same as the average particle diameter of the sulfide solid electrolyte of the present embodiment as mentioned above.

A specific surface area measured by the BET method of the amorphous solid electrolyte obtained by the present production method is 20 $m^2$/g or more, a value of which is the same as the specific surface area of the sulfide solid electrolyte of the present embodiment as mentioned above.

(Crystalline Solid Electrolyte)

The crystalline solid electrolyte obtained by the present production method may be a so-called glass ceramics which is obtained by heating the amorphous solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around of 2θ=20.2° and 23.6° (see, for example, JP 2013-16423 A).

In addition, examples thereof include an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725). Among them, the thio-LISICON Region II-type crystal structure is preferred as the crystal structure of the crystalline solid electrolyte obtained by the present production method from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure. In addition, though the crystalline solid electrolyte obtained by the present production method may be one having the aforementioned thio-LISICON Region II-type crystal structure or may be one having the thio-LISICON Region II-type crystal structure as a main crystal, it is preferably one having the thio-LISICON Region II-type crystal structure as a main crystal from the viewpoint of obtaining a higher ionic conductivity. In this specification, the wording "having as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline solid electrolyte obtained by the present production method is preferably one not containing crystalline $Li_3PS_4$ (β-$Li_3PS_4$).

In the X-ray diffractometry using a CuKα ray, the $Li_3PS_4$ crystal structure gives diffraction peaks, for example, at around 2θ=17.5°, 18.3°, 26.1°, 27.3°, and 30.0°; the $Li_4P_2S_6$ crystal structure gives diffraction peaks, for example, at around $2\theta=16.9°$, $27.1°$, and $32.5°$; the $Li_7PS_6$ crystal structure gives diffraction peaks, for example, at around $2\theta=15.3°$, $25.2°$, $29.6°$, and $31.0°$; the $Li_7P_3S_{11}$ crystal structure gives diffraction peaks, for example, at around $2\theta=17.8°$, $18.5°$, $19.7°$, $21.8°$, $23.7°$, $25.9°$, $29.6°$, and $30.0°$; the $Li_{4-x}Ge_{1-x}P_xS_4$-based thio-LISICON Region II-type crystal structure gives diffraction peaks, for example, at around $2\theta=20.1°$, $23.9°$, and $29.5°$; and the crystal structure similar to the $Li_{4-x}Ge_{1-x}P_xS_4$-based thio-LISICON Region II-type crystal structure gives diffraction peaks, for example, at around $2\theta=20.2°$ and $23.6°$. The position of these peaks may vary within a range of $\pm 0.5°$.

As mentioned above, in the case when the thio-LISICON Region II-type crystal structure is obtained in the present embodiment, the foregoing crystal structure is preferably one not containing crystalline $Li_3PS_4$ ($\beta$-$Li_3PS_4$). FIG. 3 shows an X-ray diffractometry example of the crystalline solid electrolyte obtained by the present production method. In addition, FIG. 4 shows an X-ray diffractometry example of crystalline $Li_3PS_4$ ($\beta$-$Li_3PS_4$). As grasped from FIGS. 3 and 4, the sulfide solid electrolyte of the present embodiment does not have diffraction patterns at $2\theta=17.5°$ and $26.1°$, or even in the case where it has diffraction patterns, extremely small peaks as compared with the diffraction peaks of the thio-LISICON Region II-type crystal structure are merely detected.

The crystal structure represented by a compositional formula $Li_{7-x}P_{1-y}Si_yS_6$ or $Li_{7+x}P_{1-y}Si_yS_6$ (x is $-0.6$ to $0.6$, and y is $0.1$ to $0.6$), which has the aforementioned structure skeleton of $Li_7PS_6$ and in which a part of P is substituted with Si, is a cubic crystal or a rhombic crystal, and is preferably a cubic crystal, and in X-ray diffractometry using a CuK$\alpha$ ray, the crystal structure gives peaks appearing mainly at $2\theta=15.5°$, $18.0°$, $25.0°$, $30.0°$, $31.4°$, $45.3°$, $47.0°$, and $52.0°$. The crystal structure represented by the aforementioned compositional formula $Li_{7-x-2y}PS_{6-x-y}Cl_x$ ($0.8 \leq x \leq 1.7$, and $0 < y \leq (-0.25x+0.5)$) is preferably a cubic crystal, and in the X-ray diffractometry using a CuK$\alpha$ ray, the crystal structure gives peaks appearing mainly at $2\theta=15.5°$, $18.0°$, $25.0°$, $30.0°$, $31.4°$, $45.3°$, $47.0°$, and $52.0°$. In addition, the crystal structure represented by the aforementioned compositional formula $Li_{7-x}PS_{6-x}Ha_x$ (Ha represents Cl or Br, and x is preferably $0.2$ to $1.8$) is preferably a cubic crystal, and in the X-ray diffractometry using a CuK$\alpha$ ray, the crystal structure gives peaks appearing mainly at $2\theta=15.5°$, $18.0°$, $25.0°$, $30.0°$, $31.4°$, $45.3°$, $47.0°$, and $52.0°$.

These peak positions may vary within a range of $\pm 0.5°$.

Further, in the crystalline sulfide solid electrolyte obtained by the present production method, a half width of a maximum peak including the background at $2\theta=10$ to $40°$ in the X-ray diffractometry using a CuK$\alpha$ ray is preferably $\Delta 2\theta=0.32$ or less. In view of the fact that the crystalline sulfide solid electrolyte has such properties, a higher ionic conductivity is obtained, and the battery performance is enhanced. From the same viewpoint, the half width of a maximum peak is more preferably $\Delta 2\theta=0.30$ or less, and still more preferably $\Delta 2\theta=0.28$ or less.

As the crystalline sulfide solid electrolyte having such properties, there is typically exemplified one having a thio-LISICON Region II-type crystal structure.

Figure 5:
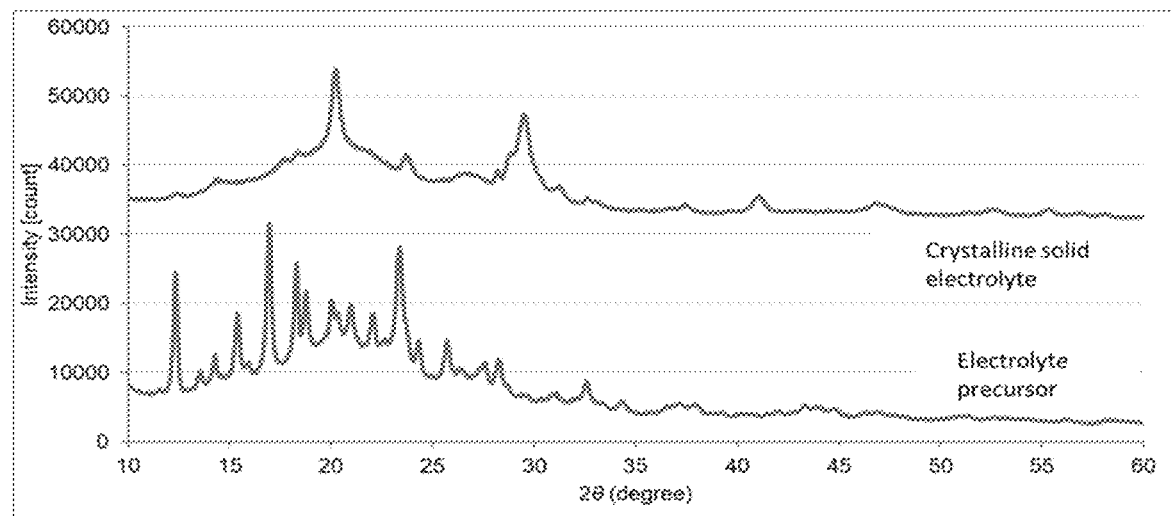
FIG. 5 is an X-ray diffraction spectrum of each of an amorphous sulfide solid electrolyte and a crystalline sulfide solid electrolyte obtained in Example 1.

For example, FIG. 5 shows an X-ray diffractometry example of a crystalline sulfide solid electrolyte having a thio-LISICON Region II-type crystal structure obtained in Example 1, a maximum peak including the background at $2\theta=10$ to $40°$ is a peak at $20.1°$, and thus, it is noted that the half width in the foregoing peak has a sharp peak as $\Delta 2\theta=0.25$. In this way, in view of the fact that the maximum peak has a sharp peak whose half width is $0.32$ or less, the crystalline sulfide solid electrolyte reveals an extremely high ionic conductivity, and the battery performance can be enhanced. The matter that the crystalline sulfide solid electrolyte has such a half width expresses high crystallinity. According to this, disintegration can be achieved with a small energy, and therefore, a lowering of the ionic conductivity owing to vitrification (amorphization) hardly takes places. In addition, the precursor for mechanical treatment of the present embodiment has favorable crystallinity while having a porous structure having a relatively large specific surface area. Thus, even when a part or the whole of the precursor for mechanical treatment is vitrified owing to disintegration and granulation, a change of the morphology during recrystallization is relatively suppressed, and therefore, the morphology can be readily adjusted by the mechanical treatment.

The calculation of the half width can be determined in the following manner.

A range of $[(\text{maximum peak}) \pm 2°]$ is used. When defining a proportion of the Lorentzian function as A ($0 \leq A \leq 1$), a peak intensity correction value as B, a $2\theta$ maximum peak as C, a peak position of a range to be used for calculation ($C \pm 2°$) as D, a half value as E, a background as F, and each peak intensity of a peak range to be used for calculation as G, respectively, the following calculation is performed at every peak position on defining the variables as A, B, C, D, E, and F.

$$H = G - \{B \times \{A/(1+(D-C)^2/E^2) + (1-A) \times \exp(-1 \times (D-C)^2/E^2)\} + F\}$$

H's are totaled within the peak ($C \pm 2°$), and the total value is minimized with the Solver function of a spreadsheet program Excel (Microsoft Corporation) in terms of GRG nonlinearity, whereby the half width can be determined.

Although the shape of the crystalline solid electrolyte is not particularly restricted, examples thereof include a granular shape. The average particle diameter ($D_{50}$) of the granular amorphous solid electrolyte is, for example, within a range of $0.01$ to $500$ μm, and $0.1$ to $200$ μm.

A volume-based average particle diameter of the crystalline solid electrolyte obtained by the present production method is $3$ μm or more, a value of which is the same as the average particle diameter of the sulfide solid electrolyte of the present embodiment as mentioned above.

In addition, a specific surface area measured by the BET method of the crystalline solid electrolyte obtained by the present production method is $20$ m$^2$/g or more, a value of which is the same as the specific surface area of the sulfide solid electrolyte of the present embodiment as mentioned above.

Embodiment B

Next, the Embodiment B is described.

The Embodiment B is concerned with a mode in which in the present production method including mixing a raw material inclusion containing a lithium element, a sulfur element, a phosphorus element, and a halogen element with a complexing agent, raw materials containing, as the raw material inclusion, a solid electrolyte, such as $Li_3PS_4$, and the like and the complexing agent are used. In the Embodiment A, the electrolyte precursor is formed while synthesizing the lithium-containing structure, such as $Li_3PS_4$, existent as a main structure in the solid electrolyte obtained by the present production method, through reaction among the raw materials, such as lithium sulfide, and therefore, it may be considered that a constitution ratio of the aforementioned structure is liable to become small.

Then, in the Embodiment B, a solid electrolyte containing the aforementioned structure is previously prepared by means of production or the like, and this is used as the raw material. According to this, an electrolyte precursor in which the aforementioned structure and the raw materials containing lithium, such the lithium halide, are bound (coordinated) with each other via the complexing agent, and the halogen element is dispersed and fixed is more likely obtained. As a result, a solid electrolyte having not only predetermined average particle diameter and specific surface area but also a high ionic conductivity, in which the generation of hydrogen sulfide is suppressed, is obtained.

Examples of the raw material containing a lithium element, a sulfur element, and a phosphorus element, which may be used in the Embodiment B, include an amorphous solid electrolyte or crystalline solid electrolyte having a $PS_4$ structure as a molecular structure. From the viewpoint of suppressing the generation of hydrogen sulfide, a $P_2S_7$ structure-free amorphous solid electrolyte or crystalline solid electrolyte is preferred. As such a solid electrolyte, ones produced by a conventionally existing production method, such as a mechanical milling method, a slurry method, and a melt quenching method, can be used, and commercially available products can also be used.

In addition, in this case, the solid electrolyte containing a lithium element, a sulfur element, and a phosphorus element is preferably an amorphous solid electrolyte. The dispersibility of the halogen element in the electrolyte precursor is enhanced, and the halogen element is easily bound with the lithium element, the sulfur element, and the phosphorus element in the solid electrolyte, and as a result, a solid electrolyte having not only predetermined average particle diameter and specific surface area but also a higher ionic conductivity can be obtained.

In the embodiment B, the content of the amorphous solid electrolyte having a $PS_4$ structure or the like is preferably 60 to 100 mol %, more preferably 65 to 90 mol %, and still more preferably 70 to 80 mol % relative to the total of the raw materials.

In the case of using the amorphous solid electrolyte having a $PS_4$ structure or the like and the halogen simple substance, the content of the halogen simple substance is preferably 1 to 50 mol %, more preferably 2 to 40 mol %, still more preferably 3 to 25 mol %, and yet still more preferably 3 to 15 mol % relative to the amorphous solid electrolyte having a $PS_4$ structure or the like.

Besides, in the case of using the halogen simple substance and the lithium halide and the case of using the two halogen simple substances, the same as in the Embodiment A is applicable.

In the Embodiment B, in all other cases than the raw materials, for example, the complexing agent, the mixing, the heating, the drying, the amorphous solid electrolyte, and the crystalline solid electrolyte, and the like are the same as those described in the Embodiment A.

In addition, in the Embodiment B, the matter that what the electrolyte precursor is pulverized is preferred, the pulverizer to be used for pulverization, the matter that after mixing or after drying, the pulverization may be performed, various conditions regarding pulverization, and so on are also the same as those in the Embodiment A.

Embodiments C and D

Figure 2:
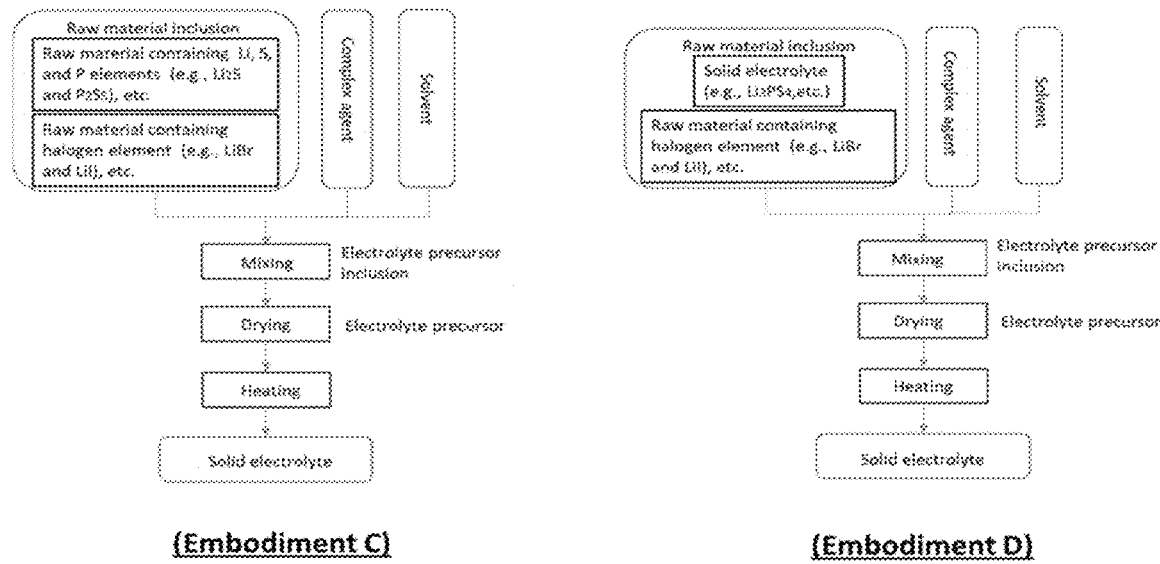
FIG. 2 is a flow chart of explaining one example of preferred embodiments of a production method of a precursor for mechanical treatment.

As shown in the flow chart of FIG. 2, the Embodiments C and D are different from the Embodiments A and B, respectively from the standpoint that a solvent is added to the raw material inclusion and the complexing agent. The Embodiments C and D are concerned with a heterogeneous method of solid-liquid coexistence, whereas in the Embodiments A and B, the electrolyte precursor that is a solid is formed in the complexing agent that is a liquid. At this time, when the electrolyte precursor is easily soluble in the complexing agent, there is a case where separation of the components is generated. In the Embodiments C and D, by using a solvent in which the electrolyte precursor is insoluble, elution of the components in the electrolyte precursor can be suppressed.

(Solvent)

In the production method of the Embodiments C and D, it is preferred to add the solvent to the raw material inclusion and the complexing agent. In view of the fact that the raw material inclusion and the complexing agent are mixed using the solvent, an effect to be brought by using the complexing agent, namely an effect in which formation of the electrolyte precursor acting with the lithium element, the sulfur element, the phosphorus element, and the halogen element is promoted, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen element is more likely dispersed and fixed is obtained, as a result, not only predetermined average particle diameter and specific surface area but also a high ionic conductivity is obtained, is easily exhibited.

The present production method is a so-called heterogeneous method, and it is preferred that the electrolyte precursor is not completely dissolved in the complexing agent that is a liquid but deposited. In the Embodiments C and D, by adding the solvent, the solubility of the electrolyte precursor can be adjusted. In particular, the halogen element is liable to be eluted from the electrolyte precursor, and therefore, by adding the solvent, the elution of the halogen element is suppressed, whereby the desired electrolyte precursor is obtained. As a result, a crystalline solid electrolyte having not only predetermined average particle diameter and specific surface area but also a high ionic conductivity, in which the generation of hydrogen sulfide is suppressed, namely the sulfide solid electrolyte of the present embodiment, can be obtained via the electrolyte precursor in which the components, such as a halogen, are dispersed.

As the solvent having such properties, a solvent having a solubility parameter of 10 or less is preferably exemplified. In this specification, the solubility parameter is described in various literatures, for example, "Handbook of Chemistry" (published in 2004, Revised 5th Edition, by Maruzen Publishing Co., Ltd.) and is a value δ $((cal/cm^3)^{1/2})$ calculated according to the following numerical formula (1), which is also called a Hildebrand parameter, SP value.

$$\delta = \sqrt{(\Delta H - RT)/V} \qquad (1)$$

In the numerical formula (1), ΔH is a molar heating value; R is a gas constant; T is a temperature; and V is molar volume.

By using the solvent having a solubility parameter of 10 or less, the solvent has such properties that as compared by the aforementioned complexing agent, it relatively hardly dissolves the halogen element, the raw materials containing a halogen element, such as a lithium halide, and further the halogen element-containing component constituting the co-crystal contained in the electrolyte precursor (for example, an aggregate in which lithium halide and the complexing agent are bound with each other); it is easy to fix the halogen element within the electrolyte precursor; the halogen element is existent in a favorable state in the resulting electrolyte precursor and further the solid electrolyte; and a solid electrolyte having not only predetermined average particle diameter and specific surface area but also a high ionic conductivity is readily obtained. That is, it is preferred that the solvent which is used in the present embodiment has such properties that it does not dissolve the electrolyte precursor. From the same viewpoint, the solubility parameter of the solvent is preferably 9.5 or less, more preferably 9.0 or less, and still more preferably 8.5 or less.

More specifically, as the solvent which is used in the production method of the Embodiments C and D, it is possible to broadly adopt a solvent which has hitherto been used in the production of a solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol-based solvent, an ester-based solvent, an aldehyde-based solvent, a ketone-based solvent, an ether-based solvent, and a solvent containing a carbon atom and a hetero atom. Of these, preferably, a solvent having a solubility parameter falling within the aforementioned range may be appropriately selected and used.

More specifically, examples of the solvent include an aliphatic hydrocarbon solvent, such as hexane (7.3), pentane (7.0), 2-ethylhexane, heptane (7.4), octane (7.5), decane, undecane, dodecane, and tridecane; an alicyclic hydrocarbon solvent, such as cyclohexane (8.2) and methylcyclohexane; an aromatic hydrocarbon solvent, such as benzene, toluene (8.8), xylene (8.8), mesitylene, ethylbenzene (8.8), tert-butylbenzene, trifluoromethylbenzene, nitrobenzene, chlorobenzene (9.5), chlorotoluene (8.8), and bromobenzene; an alcohol-based solvent, such as ethanol (12.7) and butanol (11.4); an ester-based solvent, such as ethyl acetate (9.1) and butyl acetate (8.5); an aldehyde-based solvent, such as formaldehyde, acetaldehyde (10.3), and dimethylformamide (12.1); a ketone-based solvent, such as acetone (9.9) and methyl ethyl ketone; an ether-based solvent, such as diethyl ether (7.4), diisopropyl ether (6.9), dibutyl ether, tetrahydrofuran (9.1), dimethoxyethane (7.3), cyclopentylmethyl ether (8.4), tert-butylmethyl ether, and anisole; and a solvent containing a carbon atom and a hetero atom, such as acetonitrile (11.9), dimethyl sulfoxide, and carbon disulfide. The numerical values within the parentheses in the aforementioned exemplifications are an SP value.

Of these solvents, an aliphatic hydrocarbon solvent, an alicyclic hydrocarbon solvent, an aromatic hydrocarbon solvent, and an ether-based solvent are preferred; from the viewpoint of obtaining not only predetermined average particle diameter and specific surface area but also a higher ionic conductivity more stably, heptane, cyclohexane, toluene, ethylbenzene, diethyl ether, diisopropyl ether, dibutyl ether, dimethoxyethane, cyclopentylmethyl ether, tert-butylmethyl ether, and anisole are more preferred; diethyl ether, diisopropyl ether, and dibutyl ether are still more preferred; diisopropyl ether and dibutyl ether are yet still more preferred; and dibutyl ether is especially preferred. The solvent which is used in the present embodiment is preferably the organic solvent as exemplified above and is an organic solvent different from the aforementioned complexing agent. In the present embodiment, these solvents may be used alone or in combination of a plural kind thereof.

In the case of using the solvent, the content of the raw materials in the raw material inclusion may be regulated to one relative to one liter of the total amount of the complexing agent and the solvent.

As for drying in the Embodiments C and D, the electrolyte precursor inclusion can be dried at a temperature according to the kind of each of the remaining complexing agent (complexing agent not incorporated into the electrolyte precursor) and the solvent. For example, the drying can be performed at a temperature of a boiling point of the complexing agent or solvent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature) ±about 5° C.), to volatilize the complexing agent and the solvent. In addition, in the heating in the Embodiments C and D, in the case where the solvent remains in the electrolyte precursor, the solvent is also removed. However, different from the complexing agent constituting the electrolyte precursor, the solvent hardly constitutes the electrolyte precursor. In consequence, the content of the solvent which may remain in the electrolyte precursor is typically 3% by mass or less, preferably 2% by mass or less, and more preferably 1% by mass or less.

In the Embodiment C, in all other cases than the solvent, for example, the complexing agent, the mixing, the heating, the drying, the amorphous solid electrolyte, and the crystalline solid electrolyte, and the like are the same as those described in the Embodiment A. In addition, also in the Embodiment D, all other cases than the solvent are the same as those described in the Embodiment B.

In addition, in the Embodiments C and D, the matter that what the electrolyte precursor is pulverized is preferred, the pulverizer to be used for pulverization, the matter that after mixing or after drying, the pulverization may be performed, various conditions regarding pulverization, and so on are also the same as those in the Embodiment A.

(Application of Sulfide Solid Electrolyte)

The solid electrolyte which is obtained by the present production method as described above, namely the sulfide solid electrolyte of the present embodiment, has not only predetermined average particle diameter and specific surface area but also a high ionic conductivity and also has an excellent battery performance, and hardly generates hydrogen sulfide, so that it is suitably used for batteries. In addition, as mentioned previously, the foregoing solid electrolyte, i.e., the sulfide solid electrolyte, is suitably used as a precursor for mechanical treatment, which is used for the mechanical treatment for the purpose of adjusting the morphology especially by means of mechanical treatment. In the case of being used as the precursor for mechanical treatment, after forming the sulfide solid electrolyte having been adjusted to the desired morphology, it is suitably used for batteries.

In the case of adopting a lithium element as the conduction species, such is especially suitable. The solid electrolyte of the present embodiment, which is obtained by the present production method, may be used for a positive electrode layer, may be used for a negative electrode layer, or may be used for an electrolyte layer. Each of the layers can be produced by a known method.

In addition, the aforementioned battery preferably uses a collector in addition to the positive electrode layer, the electrolyte layer, and the negative electrode layer, and the collector can be any known one. For example, a layer formed by coating Au, Pt, Al, Ti, Cu, or the like capable of reacting with the aforementioned solid electrolyte, with Au or the like can be used.

[Treatment Method of Sulfide Solid Electrolyte]

The treatment method of a sulfide solid electrolyte of the present embodiment includes subjecting a sulfide solid electrolyte having a volume-based average particle diameter measured by laser diffraction particle size distribution measurement of 3 µm or more and a specific surface area measured by the BET method of 20 $m^2/g$ or more to at least one mechanical treatment selected from disintegration and granulation. That is, the treatment method of a sulfide solid electrolyte of the present embodiment includes subjecting the aforementioned sulfide solid electrolyte (precursor for mechanical treatment) of the present embodiment to at least one mechanical treatment selected from disintegration and granulation.

By subjecting the aforementioned sulfide solid electrolyte (precursor for mechanical treatment) of the present embodiment to mechanical treatment, it is possible to easily adjust the morphology unavailable traditionally, or adjust a desired morphology, and a sulfide solid electrolyte having not only desired morphology but also a high ionic conductivity is obtained. In addition, since the precursor for mechanical treatment is different from a primary particle in which a new surface having high activity is exposed through pulverization of a coarse particle, it can be easily atomized through disintegration even without using a dispersant.

Although the method of mechanical treatment of the precursor for mechanical treatment is not particularly restricted so long as at least one treatment of disintegration and granulation is included, examples thereof include a method of using an apparatus, such as a pulverizer and an agitator.

Examples of the agitator include a mechanical agitation type mixer having an impeller provided in a tank, as exemplified as an apparatus which may be used for the aforementioned production method of a precursor for mechanical treatment. Examples of the mechanical agitation type mixer include a high-speed agitation type mixer and a double arm type mixer, and all of these types can be adopted. From the viewpoint of more easily adjusting the desired morphology, a high-speed agitation type mixer is preferred. More specifically, examples of the high-speed agitation type mixer include a vertical axis rotating type mixer and a lateral axis rotating type mixer as mentioned previously, and besides, various apparatuses, such as a high-speed rotation thin-film-type agitator and a high-speed shear-type agitator. Above all, from the viewpoint of more easily adjusting the desired morphology, a high-speed rotation thin-film-type agitator (also referred to as "thin-film rotation-type high-speed mixer) is preferred.

Examples of the pulverizer which may be used for the treatment method of a sulfide solid electrolyte of the present embodiment include a pulverizer provided with a rotating body capable of agitating the sulfide solid electrolyte having a volume-based average particle diameter measured by laser diffraction particle size distribution measurement of 3 µm or more and a specific surface area measured by the BET method of 20 $m^2/g$ or more, namely the precursor for mechanical treatment.

In the treatment method of a sulfide solid electrolyte of the present embodiment, by adjusting a circumferential velocity of the rotating body provided in the pulverizer, the disintegration (atomization) and granulation (particle growth) of the precursor for mechanical treatment can be adjusted, namely the average particle diameter can be decreased through disintegration, or the average particle diameter can be increased through granulation, and therefore, the morphology of the sulfide solid electrolyte can be readily freely adjusted. More specifically, by rotating the rotating body at a low circumferential velocity, the disintegration can be achieved, whereas by rotating the rotating body at a high circumferential velocity, it becomes possible to achieve the granulation. In this way, only by adjusting the circumferential velocity of the rotating body, the morphology of the sulfide solid electrolyte can be easily adjusted.

With respect to the circumferential velocity of the rotating body, the low circumferential velocity or the high circumferential velocity may vary with, for example, particle diameter, material, and use amount of a medium to be used in the pulverizer, and therefore, it cannot be unequivocally prescribed. For example, in the case of an apparatus not using a pulverization medium, such as a ball and a bead, as in the high-speed rotation thin-film-type agitator, even at a relatively high circumferential velocity, the disintegration mainly takes place, and the granulation hardly takes place. On the other hand, in the case of an apparatus using a pulverization medium, such as a ball mill and a bead mill, as mentioned previously, the disintegration can be performed at a low circumferential velocity, and it becomes possible to achieve the granulation at a high circumferential velocity. In consequence, so long as the predetermined conditions of a pulverization apparatus, the pulverization medium, and so on are identical, the circumferential velocity at which the disintegration can be achieved is lower than the circumferential velocity at which the granulation can be achieved. In consequence, for example, under a condition under which the granulation can be achieved when designating the circumferential velocity of 6 m/s as the boarder, the low circumferential velocity means less than 6 m/s, whereas the high circumferential velocity means 6 m/s or more.

More, specifically, examples of the pulverizer include a medium type pulverizer. The medium type pulverizer is roughly classified into a container driving type pulverizer and a medium agitation type pulverizer.

Examples of the container driving type pulverizer include a ball mill or bead mill provided with an agitation tank, a pulverization tank, or a combination thereof. As the ball mill or bead mill, all of various types, such as a rotating type, a rolling type, a vibration type, and a planetary type, can be adopted.

In addition, examples of the medium agitation type pulverizer include various pulverizers, such as an impact type pulverizer, e.g., a cutter mill, a hammer mill, and a pin mill; a tower type pulverizer, e.g., a tower mill; an agitation tank type pulverizer, e.g., an attritor, an aquamizer, and a sand grinder; a flow tank type pulverizer, e.g., a visco mill and a pearl mill; a flow tube type pulverizer; an annular pulverizer, e.g., a co-ball-mill; and a continuous dynamic type pulverizer.

In the treatment method of a sulfide solid electrolyte of the present embodiment, from the viewpoint of more easily adjusting the desired morphology, a container driving type pulverizer is preferred, and above all, a bead mill and a ball mill are preferred. The container driving type pulverizer, such as a bead mill and a ball mill, is provided with, as a rotating body capable of agitating the precursor for mechanical treatment, a container for housing the foregoing precursor for mechanical treatment, such as an agitation tank and a pulverization tank. Accordingly, as mentioned previously, the morphology of the sulfide solid electrolyte can be easily adjusted through adjustment of the circumferential velocity of the rotating body.

The bead mill or ball mill is also able to adjust the morphology by adjusting the particle diameter, material, and use amount of a bead, a ball, or the like to be used, and therefore, it is possible to adjust finer morphology, and it is also possible to adjust the morphology unavailable traditionally. For example, as the bead mill, a type that is a centrifugation type and is able to use so-called microbeads of an ultrafine particle (about φ0.015 to 1 mm) (for example, Ultra Apex Mill (UAM)).

With respect to the adjustment of the morphology, as the energy to be given to the precursor for mechanical treatment is made small, namely the circumferential velocity of the rotating body is decreased, or the particle diameter of the bead or ball or the like is made small, there is a tendency that the average particle diameter becomes small (disintegration), and the specific surface area becomes large; whereas as the energy is increased, namely the circumferential velocity of the rotating body is increased, or the particle diameter of the bead or ball or the like is made large, there is a tendency that the average particle diameter becomes large (granulation), and the specific surface area becomes small.

In addition, for example, as the time for mechanical treatment is made long, the average particle diameter tends to become large (granulation).

The particle diameter of the medium which is used for the bead mill, the ball mill, or the like may be appropriately determined taking into account the desired morphology as well as the kind, size, etc. of the apparatus to be used. In general, the particle diameter of the medium is preferably 0.01 mm or more, more preferably 0.015 mm or more, still more preferably 0.02 mm or more, and yet still more preferably 0.04 mm or more, and an upper limit thereof is preferably 3 mm or less, more preferably 2 mm or less, still more preferably 1 mm or less, and yet still more preferably 0.8 mm or less.

In addition, examples of a material of the medium include metals, such as stainless steel, chromium steel, and tungsten carbide; ceramics, such as zirconia and silicon nitride; and minerals, such as agate.

The treatment time of mechanical treatment may be appropriately determined taking into account the desired morphology as well as the kind, size, etc. of the apparatus to be used. In general, the treatment time of mechanical treatment is preferably 5 seconds or more, more preferably 30 seconds or more, still more preferably 3 minutes or more, and yet still more preferably 15 minutes or more, and an upper limit thereof is preferably 5 hours or less, more preferably 3 hours or less, still more preferably 2 hours or less, and yet still more preferably 1.5 hours or less.

The circumferential velocity of the rotating body in the mechanical treatment (rotational speed in the apparatus, such a bead mill and a ball mill) may be appropriately determined taking into account the desired morphology as well as the kind, size, etc. of the apparatus to be used. In general, the circumferential velocity of the rotating body is preferably 0.5 m/s or more, more preferably 1 m/s or more, still more preferably 2 m/s or more, and yet still more preferably 3 m/s or more, and an upper limit thereof is preferably 55 m/s or less, more preferably 40 m/s or less, still more preferably 25 m/s or less, and yet still more preferably 15 m/s or less. In addition, the circumferential velocity may be even or can be altered on the way.

The mechanical treatment can be performed together with a solvent. The solvent can be appropriately selected and used among those exemplified above as the solvent which is used in the Embodiments C and D of the production method of a precursor for mechanical treatment. From the viewpoint of obtaining not only the predetermined average particle diameter and specific surface area but also a high ionic conductivity more stably, as the solvent, an aliphatic hydrocarbon solvent, an alicyclic hydrocarbon solvent, an aromatic hydrocarbon solvent, and an ether-based solvent are preferred; heptane, cyclohexane, toluene, ethylbenzene, diethyl ether, diisopropyl ether, dibutyl ether, dimethoxyethane, cyclopentylmethyl ether, tert-butylmethyl ether, and anisole are more preferred; heptane, toluene, and ethylbenzene are still more preferred; and heptane and toluene are yet still more preferred. In the present embodiment, even when a dispersant is not used, the atomization can be readily achieved through disintegration. However, from the viewpoint of more increasing the dispersion and more efficiently achieving the atomization, a dispersant may be used. Among the aforementioned solvents, for example, the ether-based solvent may function as the dispersant.

The use amount of the solvent may be regulated to an amount such that the content of the precursor for mechanical treatment relative to the total amount of the precursor for mechanical treatment and the solvent is preferably 1% by mass or more, more preferably 3% by mass or more, and still more preferably 5% by mass or more, and an upper limit thereof is preferably 30% by mass or less, more preferably 20% by mass or less, and still more preferably 15% by mass or less.

In the case where the precursor for mechanical treatment is an amorphous solid electrolyte, heat treatment for crystallization becomes necessary. On the other hand, in the case where the precursor for mechanical treatment is a crystalline solid electrolyte, heat treatment for crystallization is basically unnecessary. However, there is a case where while the energy of mechanical treatment is relatively small, a part or the whole of the crystalline solid electrolyte is vitrified (amorphized). In this case, reheat treatment may be performed. That is, the treatment method of the present embodiment may include heating after the mechanical treatment of a precursor for mechanical treatment. In addition, in the treatment method of the present embodiment, the heating may be performed not only after the mechanical treatment but also before the foregoing treatment.

The crystalline solid electrolyte of the present embodiment has a morphology such that different from a primary particle in which a new surface is exposed through pulverization of a coarse particle, chemically stable primary particles are gathered, and therefore, granulation in the reheat treatment is relatively suppressed. In consequence, it is easy to adjust the morphology as compared with a conventional method of atomizing a coarse particle.

In addition, in the treatment method of a sulfide solid electrolyte of the present embodiment, it is preferred to obtain the sulfide solid electrolyte (precursor for mechanical treatment) serving as a raw material for the treatment method, which has a volume-based average particle diameter measured by laser diffraction particle size distribution measurement of 3 μm or more and a specific surface area measured by the BET method of 20 m$^2$/g or more through a step including mixing a raw material inclusion containing a lithium element, a sulfur element, a phosphorus element, and a halogen element with a complexing agent.

The mixing and the heating in the treatment method of a sulfide solid electrolyte of the present embodiment are identical with the mixing and the heating in the production method as mentioned above for the production method of a precursor for mechanical treatment. In addition, in the treatment method of a sulfide solid electrolyte of the present embodiment, the contents other than the mixing and the heating in the production method as mentioned above for the production method of a precursor for mechanical treatment can be appropriately adopted.

In accordance with the treatment of a sulfide solid electrolyte of the present embodiment, a sulfide solid electrolyte having the desired morphology can be easily produced.

Although the volume-based average particle diameter of the sulfide solid electrolyte obtained by the treatment method of a sulfide solid electrolyte of the present embodiment may be adjusted according to the desire, it is typically 0.05 μm or more, preferably 0.07 μm or more, more preferably 0.1 μm or more, and still more preferably 0.15 μm or more, and an upper limit thereof is typically 50 μm or less, preferably 30 μm or less, more preferably 20 μm or less, still more preferably 15 μm or less, and yet still more preferably 10 μm or less.

In addition, although the specific surface area of the foregoing sulfide solid electrolyte may also be adjusted according to the desire, it is typically 0.1 m$^2$/g or more, preferably 0.3 m$^2$/g or more, more preferably 0.5 m$^2$/g or less, and still more preferably 1 m$^2$/g or more, and an upper limit thereof is typically 70 m$^2$/g or less, preferably 50 m$^2$/g or less, more preferably 45 m$^2$/g or less, and still more preferably 40 m$^2$/g or less.

(Application of Sulfide Solid Electrolyte)

The sulfide solid electrolyte obtained by the treatment method of a sulfide solid electrolyte of the present embodiment has the desired morphology according to an application and can be used for the same application as the application described above in the section of "Application of Sulfide Solid Electrolyte" (which may also be called an application of precursor for mechanical treatment). That is, the sulfide solid electrolyte obtained by the treatment method of a sulfide solid electrolyte of the present embodiment can be used for a positive electrode layer, a negative electrode layer, and an electrolyte layer in an all-solid-state lithium battery.

EXAMPLES

Next, the present invention is described specifically with reference to Examples, but it should be construed that the present invention is by no means restricted by these Examples.

Production Example 1

In a one-liter impeller-provided reaction tank, 15.3 g of lithium sulfide and 24.7 g of diphosphorus pentasulfide were added in a nitrogen atmosphere. After actuating the impeller, 400 mL of tetrahydrofuran which had been previously cooled to −20° C. was introduced into the container. After naturally raising the temperature to room temperature (23° C.), agitation was continued for 72 hours, the obtained reaction liquid slurry was charged in a glass filter (pore size: 40 to 100 μm) to obtain a solid component, and then, the solid component was dried at 90° C., thereby obtaining 38 g of Li$_3$PS$_4$ (purity: 90% by mass) as a white powder. The obtained powder was subjected to powder X-ray diffractometry (XRD) with an X-ray diffraction (XRD) apparatus (SmartLab apparatus, manufactured Rigaku Corporation). As a result, the foregoing powder expressed a hallow pattern and confirmed to be amorphous Li$_3$PS$_4$.

Example 1

Into a stirring bar-containing Schlenk flask (capacity: 100 mL), 1.70 g of the white powder (Li$_3$PS$_4$: 1.53 g) obtained in Production Example 1, 0.19 g of lithium bromide, and 0.28 g of lithium iodide were introduced in a nitrogen atmosphere. After rotating the stirring bar, 20 mL of tetramethylethylenediamine (TMEDA) as a complexing agent was added, agitation was continued for 12 hours, and the obtained electrolyte precursor inclusion was dried in vacuo (at room temperature: 23° C.) to obtain an electrolyte precursor as a powder. Subsequently, the powder of the electrolyte precursor was heated at 120° C. in vacuo for 2 hours, thereby obtaining an amorphous solid electrolyte. Furthermore, the amorphous solid electrolyte was heated at 140° C. in vacuo for 2 hours, thereby obtaining a crystalline solid electrolyte (the heating temperature for obtaining a crystalline solid electrolyte (140° C. in this Example) will be sometimes referred to as "crystallization temperature").

A part of each of the obtained powder of the electrolyte precursor and crystalline solid electrolyte was dissolved in methanol, the obtained methanol solution was subjected to gas chromatographic analysis to measure the content of tetramethylethylenediamine. The content of the complexing agent in the electrolyte precursor was 55.0% by mass, and the content of the complexing agent in the crystalline solid electrolyte was 1.2% by mass.

The obtained electrolyte precursor, amorphous solid electrolyte, and crystalline solid electrolyte were subjected to powder X-ray diffractometry (XRD) with an X-ray diffraction (XRD) apparatus (SmartLab apparatus, manufactured Rigaku Corporation), and X-ray diffraction spectra are shown in FIG. 3. In addition, the obtained amorphous solid electrolyte was subjected to composition analysis through ICP analysis (inductively coupled plasma atomic emission spectrophotometry). As a result of the composition analysis, the contents of Li, P, S, Br, and I were found to be 10.1% by mass, 13.2% by mass, 55.2% by mass, 8.4% by mass, and 13.1% by mass, respectively.

In the X-ray diffraction spectrum of the electrolyte precursor, peaks different from the peaks derived from the used raw materials were observed, and an X-ray diffraction pattern different from those of the amorphous solid electrolyte and the crystalline solid electrolyte was shown. In addition, the raw materials used in this Example 1 (amorphous Li$_3$PS$_4$, lithium bromide, and lithium iodide) and the raw materials used in other Examples (lithium sulfide, diphosphorus pentasulfide, and crystalline Li$_3$PS$_4$) were also subjected to powder X-ray diffractometry (XRD), and X-ray diffraction spectra are shown in FIG. 4. The X-ray diffraction spectrum of the electrolyte precursor showed an X-ray diffraction pattern different from the X-ray diffraction spectra of the raw materials.

In the X-ray diffraction spectrum of the amorphous solid electrolyte, any peak other than the peaks derived from the raw materials was confirmed to be absent. In addition, in the X-ray diffraction spectrum of the crystalline solid electrolyte, crystallization peaks were detected at 2θ=20.2° and 23.6°, and the crystalline solid electrolyte had a thio-LISICON Region II-type crystal structure. An ionic conductivity of the crystalline solid electrolyte was measured and found to be 2.90×10$^{-3}$ (S/cm), and the crystalline solid electrolyte was confirmed to have a high ionic conductivity. A half width Δ2θ of a maximum peak (2θ=20.2°) including the background at 2θ=10 to 40° was 0.25.

In this Example, the measurement of the ionic conductivity was performed in the following manner.

From the obtained crystalline solid electrolyte, a circular pellet having a diameter of 10 mm (cross-sectional area S: 0.785 cm$^2$) and a height (L) of 0.1 to 0.3 cm was molded to prepare a sample. From the top and the bottom of the sample, electrode terminals were taken, and the ion conductivity was measured according to an alternate current impedance method (frequency range: 5 MHz to 0.5 Hz, amplitude: 10 mV) to give a Cole-Cole plot. In the vicinity of the right end of the arc observed in the high-frequency side region, a real number part Z' (Ω) at the point at which –Z" (Ω) is the smallest was referred to as a bulk resistance R (Ω) of the electrolyte, and according to the following equation, the ion conductivity σ(S/cm) was calculated.

$R = \rho(L/S)$ $\sigma = 1/\rho$

The obtained crystalline solid electrolyte had a volume-based average particle diameter of 10.5 μm and a specific surface area of 25 m²/g.

The average diameter was measured with a laser diffraction/scattering particle diameter distribution measuring device ("Partica LA-950 (model number), manufactured by HORIBA, Ltd.). In addition, the specific surface area was a value measured by the BET dynamic method (three-point method) using a nitrogen gas as an adsorbate in conformity with JIS R1626:1996.

Example 2

Into a one-liter impeller-provided reaction tank, 42.6 g of the white powder ($Li_3PS_4$: 38.3 g) obtained in Production Example 1, 4.6 g of lithium bromide, and 7.1 g of lithium iodide were introduced in a nitrogen atmosphere. After rotating the impeller, 473 mL of dibutyl ether as a solvent and 111 mL of N,N,N',N'-tetramethylethylenediamine (TMEDA) as a complexing agent were charged, and agitation was continued for 24 hours. Subsequently, 433 mL of dibutyl ether was added, and then, pulverization treatment was performed using a circulation-operable bead mill ("STAR MILL LMZ015 (a trade name)", manufactured by Ashizawa Finetech Ltd.) for 3 hours under a predetermined condition (bead material: zirconia, bead diameter: 0.5 mmφ, use amount of bead: 456 g, pump flow rate: 650 mL/min, circumferential velocity: 8 m/s, mill jacket temperature: 20° C.). The obtained slurry was dried in vacuo (room temperature: 23° C.) to obtain an electrolyte precursor as a powder. Subsequently, the powder of the electrolyte precursor was heated at 120° C. in vacuo for 2 hour, thereby obtaining a white powder of an amorphous solid electrolyte. The average particle diameter ($D_{50}$) and the specific surface area of the obtained amorphous solid electrolyte are shown in Table 1.

Example 3

The white powder obtained in Example 2 was further heated in vacuo at 160° C. for 2 hours, to obtain a white powder of a crystalline solid electrolyte. The average particle diameter ($D_{50}$), the specific surface area, and the ionic conductivity of the obtained crystalline solid electrolyte are shown in Table 1.

Example 4

Into a one-liter impeller-provided reaction tank, 14.7 g of lithium sulfide, 23.6 g of diphosphorus pentasulfide, 4.6 g of lithium bromide, and 7.1 g of lithium iodide were introduced in a nitrogen atmosphere. After rotating the impeller, 467 mL of cyclohexane as a solvent and 111 mL of N,N,N',N'-tetramethylethylenediamine (TMEDA) as a complexing agent were charged, and agitation was continued for 72 hours. Subsequently, 428 mL of cyclohexane was added, and then, pulverization treatment was performed using a circulation-operable bead mill ("STAR MILL LMZ015 (a trade name)", manufactured by Ashizawa Finetech Ltd.) for 3 hours under a predetermined condition (bead material: zirconia, bead diameter: 0.5 mmφ, use amount of bead: 456 g, pump flow rate: 650 mL/min, circumferential velocity: 8 m/s, mill jacket temperature: 20° C.). The obtained slurry was dried in vacuo (room temperature: 23° C.) to obtain an electrolyte precursor as a powder. Subsequently, the powder of the electrolyte precursor was heated at 120° C. in vacuo for 2 hour, thereby obtaining a white powder of an amorphous solid electrolyte. The average particle diameter ($D_{50}$) and the specific surface area of the obtained amorphous solid electrolyte are shown in Table 1.

Example 5

The white powder obtained in Example 4 was further heated in vacuo at 160° C. for 2 hours, to obtain a white powder of a crystalline solid electrolyte. The obtained crystalline sulfide solid electrolyte was photographed with a scanning electron microscope (SEM). The photographed image is shown in FIG. 7. The average particle diameter ($D_{50}$), the specific surface area, and the ionic conductivity of the obtained crystalline solid electrolyte are shown in Table 1.

Example 6

In a treatment container of a thin-film rotation-type high-speed mixer ("FILMIX FM-56 (a trade name), manufactured by PRIMIX Corporation), 8.0 g of the white powder obtained in Example 5 and 72 g of toluene were charged in a nitrogen atmosphere, and then, dispersion treatment was performed at a circumferential velocity of 50 m/s for 1 minute. The obtained slurry was dried in vacuo (room temperature: 23° C.) to obtain a white powder of a crystalline solid electrolyte. The obtained crystalline sulfide solid electrolyte was photographed with a scanning electron microscope (SEM). The photographed image is shown in FIG. 8. The average particle diameter ($D_{50}$), the specific surface area, and the ionic conductivity of the obtained crystalline solid electrolyte are shown in Table 1.

Example 7

In a 0.5-liter impeller-provided reaction tank, 30.0 g of the white powder obtained in Example 5 and 470 g of heptane were charged in a nitrogen atmosphere. After rotating the impeller, pulverization treatment was performed using a circulation-operable bead mill ("STAR MILL LMZ015 (a trade name)", manufactured by Ashizawa Finetech Ltd.) for 1 hour under a predetermined condition (bead material: zirconia, bead diameter: 0.5 mmφ, use amount of bead: 456 g, pump flow rate: 650 mL/min, circumferential velocity: 8 m/s, mill jacket temperature: 20° C.). The obtained slurry was dried in vacuo (room temperature: 23° C.) to obtain a white powder of an amorphous solid electrolyte. The obtained amorphous sulfide solid electrolyte was photographed with a scanning electron microscope (SEM). The photographed image is shown in FIG. 9. The average particle diameter ($D_{50}$) and the specific surface area are shown in Table 1.

Example 8

After performing the pulverization treatment in the same manner as in Example 7, the slurry was charged in a one-liter impeller-provided pressure-resistant jacketed reaction tank. The container was hermetically sealed, and the impeller was rotated. Then, a heating medium was passed through the jacket, an internal temperature of the slurry was kept at 140° C., and agitation was continued for 1 hour. The obtained slurry was dried in vacuo (room temperature: 23° C.) to obtain a white powder of a crystalline solid electrolyte. The average particle diameter ($D_{50}$), the specific surface area, and the ionic conductivity of the obtained crystalline solid electrolyte are shown in Table 1.

Example 9

The white powder obtained in Example 7 was heated in vacuo at 160° C. for 1 hour, to obtain a white powder of a crystalline solid electrolyte. The average particle diameter ($D_{50}$), the specific surface area, and the ionic conductivity of the obtained crystalline solid electrolyte are shown in Table 1.

Example 10

In a 0.5-liter impeller-provided reaction tank, 30.0 g of the white powder obtained in Example 5 and 470 g of toluene were charged in a nitrogen atmosphere. After rotating the impeller, pulverization treatment was performed using a circulation-operable bead mill ("STAR MILL LMZ015 (a trade name)", manufactured by Ashizawa Finetech Ltd.) for 30 minutes under a predetermined condition (bead material: zirconia, bead diameter: 0.5 mmφ, use amount of bead: 456 g, pump flow rate: 650 mL/min, circumferential velocity: 4 m/s, mill jacket temperature: 20° C.). The obtained slurry was dried in vacuo (room temperature: 23° C.) to obtain a white powder of an amorphous solid electrolyte. In addition, the average particle diameter ($D_{50}$) and the specific surface area of the obtained amorphous solid electrolyte are shown in Table 1.

Example 11

In a 0.5-liter impeller-provided reaction tank, 30.0 g of the white powder obtained in Example 5 and 470 g of toluene were charged in a nitrogen atmosphere. After rotating the impeller, pulverization treatment was performed using a circulation-operable bead mill ("STAR MILL LMZ015 (a trade name)", manufactured by Ashizawa Finetech Ltd.) for 1 hour under a predetermined condition (bead material: zirconia, bead diameter: 0.5 mmφ, use amount of bead: 456 g, pump flow rate: 650 mL/min, circumferential velocity: 4 m/s, mill jacket temperature: 20° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 12

In a 0.5-liter impeller-provided reaction tank, 30.0 g of the white powder obtained in Example 5 and 470 g of toluene were charged in a nitrogen atmosphere. After rotating the impeller, pulverization treatment was performed using a circulation-operable bead mill ("STAR MILL LMZ015 (a trade name)", manufactured by Ashizawa Finetech Ltd.) for 2.5 hours under a predetermined condition (bead material: zirconia, bead diameter: 0.3 mmφ, use amount of bead: 456 g, pump flow rate: 650 mL/min, circumferential velocity: 8 m/s, mill jacket temperature: 20° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 13

In a 0.5-liter impeller-provided reaction tank, 30.0 g of the white powder obtained in Example 5 and 470 g of toluene were charged in a nitrogen atmosphere. After rotating the impeller, pulverization treatment was performed using a circulation-operable bead mill ("STAR MILL LMZ015 (a trade name)", manufactured by Ashizawa Finetech Ltd.) for 2.5 hours under a predetermined condition (bead material: zirconia, bead diameter: 0.3 mmφ, use amount of bead: 456 g, pump flow rate: 650 mL/min, circumferential velocity: 12 m/s, mill jacket temperature: 20° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 14

In a 0.5-liter impeller-provided reaction tank, 30.0 g of the white powder obtained in Example 5 and 470 g of toluene were charged in a nitrogen atmosphere. After rotating the impeller, pulverization treatment was performed using a circulation-operable microbeads-compatible bead mill ("UAM-015 (model number)", manufactured by Hiroshima Metal & Machinery Co., Ltd.) for 30 minutes under a predetermined condition (bead material: zirconia, bead diameter: 0.1 mmφ, use amount of bead: 391 g, pump flow rate: 150 mL/min, circumferential velocity: 8 m/s, mill jacket temperature: 20° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 15

In a 0.5-liter impeller-provided reaction tank, 30.0 g of the white powder obtained in Example 5 and 470 g of toluene were charged in a nitrogen atmosphere. After rotating the impeller, first pulverization treatment was performed using a circulation-operable microbeads-compatible bead mill ("UAM-015 (model number)", manufactured by Hiroshima Metal & Machinery Co., Ltd.) for 30 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). Subsequently, the circumferential velocity was changed to 12.5 m/s, and second pulverization treatment was performed for 10 minutes. The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 16

In a 0.5-liter impeller-provided reaction tank, 30.0 g of the white powder obtained in Example 5 and 470 g of toluene were charged in a nitrogen atmosphere. After rotating the impeller, first pulverization treatment was performed using a circulation-operable microbeads-compatible bead mill ("UAM-015 (model number)", manufactured by Hiroshima Metal & Machinery Co., Ltd.) for 80 minutes under a predetermined condition (bead material: zirconia, bead diameter: 0.05 mmφ, use amount of bead: 391 g, pump flow rate: 150 mL/min, circumferential velocity: 12 m/s, mill jacket temperature: 20° C.). Subsequently, the circumferential velocity was changed to 10 m/s, and second pulverization treatment was performed for 10 minutes. The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 17

In a 0.5-liter impeller-provided reaction tank, 30.0 g of the white powder obtained in Example 5, 313 g of heptane, and 157 g of dibutyl ether were charged in a nitrogen atmosphere. After rotating the impeller, first pulverization treatment was performed using a circulation-operable microbeads-compatible bead mill ("UAM-015 (model number)", manufactured by Hiroshima Metal & Machinery Co., Ltd.) for 25 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). Subsequently, the circumferential velocity was changed to 12 m/s, and second pulverization treatment was performed for 25 minutes. The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 18

In a 0.5-liter impeller-provided reaction tank, 30.0 g of the white powder obtained in Example 5, 447 g of heptane, and 24 g of dibutyl ether were charged in a nitrogen atmosphere. After rotating the impeller, pulverization treatment was performed using a circulation-operable microbeads-compatible bead mill ("UAM-015 (model number)", manufactured by Hiroshima Metal & Machinery Co., Ltd.) for 25 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 19

In a 0.5-liter impeller-provided reaction tank, 30.0 g of the white powder obtained in Example 5, 461 g of heptane, and 9 g of dibutyl ether were charged in a nitrogen atmosphere. After rotating the impeller, pulverization treatment was performed using a circulation-operable microbeads-compatible bead mill ("UAM-015 (model number)", manufactured by Hiroshima Metal & Machinery Co., Ltd.) for 25 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Example 20

In a 0.5-liter impeller-provided reaction tank, 30.0 g of the white powder obtained in Example 4 and 470 g of heptane were charged in a nitrogen atmosphere. After rotating the impeller, first pulverization treatment was performed using a circulation-operable microbeads-compatible bead mill ("UAM-015 (model number)", manufactured by Hiroshima Metal & Machinery Co., Ltd.) for 35 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). Subsequently, the circumferential velocity was changed to 10 m/s, and second pulverization treatment was performed for 10 minutes. The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Comparative Example 1

Into a one-liter impeller-provided reaction tank, 20.5 g of lithium sulfide, 33.1 g of diphosphorus pentasulfide, 6.5 g of lithium bromide, and 10.0 g of lithium iodide were added in a nitrogen atmosphere. After rotating the impeller, 630 g of toluene was introduced, and this slurry was agitated for 10 minutes. Pulverization treatment was performed using a circulation-operable bead mill ("STAR MILL LMZ015 (a trade name)", manufactured by Ashizawa Finetech Ltd.) for 45 hours under a predetermined condition (bead material: zirconia, bead diameter: 0.5 mmφ, use amount of bead: 456 g, pump flow rate: 650 mL/min, circumferential velocity: 12 m/s, mill jacket temperature: 45° C.). The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Comparative Example 2

The white powder obtained in Comparative Example 1 was further heated in vacuo at 210° C. for 2 hours, to obtain a white powder of a crystalline solid electrolyte. In the X-ray diffraction spectrum of the crystalline solid electrolyte, crystallization peaks were detected at 2θ=20.2° and 23.6°, and the crystalline solid electrolyte was confirmed to have a thio-LISICON Region II-type crystal structure. A half width Δ2θ of a maximum peak (2θ=20.2°) including the background at 2θ=10 to 40° was 0.34. The average particle diameter ($D_{50}$), the specific surface area, and the ionic conductivity of the obtained crystalline solid electrolyte are shown in Table 1.

Comparative Example 3

In a 0.5-liter impeller-provided reaction tank, 30.0 g of the white powder obtained in Comparative Example 1 and 470 g of toluene were charged in a nitrogen atmosphere. After rotating the impeller, first pulverization treatment was performed using a circulation-operable microbeads-compatible bead mill ("UAM-015 (model number)", manufactured by Hiroshima Metal & Machinery Co., Ltd.) for 20 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). Subsequently, the circumferential velocity was changed to 12 m/s, and second pulverization treatment was performed for 25 minutes. The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

Comparative Example 4

In a 0.5-liter impeller-provided reaction tank, 30.0 g of the white powder obtained in Comparative Example 1 and 470 g of toluene were charged in a nitrogen atmosphere. After rotating the impeller, first pulverization treatment was performed using a circulation-operable microbeads-compatible bead mill ("UAM-015 (model number)", manufactured by Hiroshima Metal & Machinery Co., Ltd.) for 20 minutes under a predetermined condition (bead material: zirconia, bead diameter: 0.05 mmφ, use amount of bead: 391 g, pump flow rate: 150 mL/min, circumferential velocity: 8 m/s, mill jacket temperature: 20° C.). Subsequently, the circumferential velocity was changed to 12 m/s, and second pulverization treatment was performed for 15 minutes. The obtained slurry was dried in vacuo (room temperature: 23° C.) to obtain a white powder of an amorphous solid electrolyte. The average particle diameter ($D_{50}$) and the specific surface area of the obtained amorphous solid electrolyte are shown in Table 1.

TABLE 1

|  |  | Average particle diameter μm | Specific surface area m²/g | Ionic conductivity mS/cm |
|---|---|---|---|---|
| Example | 1 | 10.5 | 25 | 2.9 |
|  | 2 | 6.4 | 34 | — |
|  | 3 | 8.2 | 36 | 4.1 |
|  | 4 | 5.4 | 32 | — |
|  | 5 | 8.6 | 39 | 4.1 |
|  | 6 | 0.3 | 36 | 3.3 |
|  | 7 | 5.6 | 6 | — |
|  | 8 | 5.9 | 6 | 3.4 |
|  | 9 | 6.2 | 5 | 3.8 |
|  | 10 | 1.8 | 31 | — |
|  | 11 | 2.4 | 19 | — |
|  | 12 | 2.0 | 17 | — |
|  | 13 | 2.2 | 15 | — |
|  | 14 | 1.9 | 9 | — |
|  | 15 | 3.0 | 7 | — |
|  | 16 | 1.5 | 15 | — |
|  | 17 | 1.0 | 41 | — |
|  | 18 | 0.6 | 24 | — |
|  | 19 | 0.8 | 12 | — |
|  | 20 | 1.1 | 12 | — |
| Comparative Example | 1 | 4.5 | 3 | — |
|  | 2 | 6.6 | 2 | 4.5 |
|  | 3 | 4.7 | 3 | — |
|  | 4 | 5.9 | 3 | — |

Even in the case of an extremely small fine particle as 0.3 μm as in Example 6 in which the precursor for mechanical treatment of Example 5 (average particle diameter: 8.6 μm) was subjected to disintegration through mechanical treatment, the reduction of the ionic conductivity was suppressed, and a high ionic conductivity was revealed. Furthermore, as noted from Examples 7 to 9, even in the case where the solid electrolyte resulting from vitrification of a part or the whole of the precursor for mechanical treatment through mechanical treatment is recrystallized, the change in morphology is small. In consequence, it is possible to easily control the morphology through adjustment by mechanical treatment. On the other hand, in the Comparative Examples not using the precursor for mechanical treatment of the present embodiment, even when performing the same mechanical treatment as in the present Examples, the morphology could not be adjusted. From the foregoing results, it has been confirmed that in view of the fact that the sulfide solid electrolyte of the present embodiment has such properties that the average particle diameter is 3 μm or more, and the specific surface area is 20 m²/g, the sulfide solid electrolyte of the present embodiment is one which is able to adjust the morphology unavailable traditionally, or is readily adjusted to have the desired morphology through mechanical treatment.

INDUSTRIAL APPLICABILITY

The sulfide solid electrolyte of the present embodiment is one which is able to adjust the morphology unavailable traditionally, or is readily adjusted to have the desired morphology, and has a high ionic conductivity and an excellent battery performance. The treatment method of a solid electrolyte of the present embodiment is able to provide a solid electrolyte which is adjusted to have the desired morphology. Accordingly, the solid electrolyte according to the present embodiment is suitably used for batteries, especially batteries for information-related instruments, communication instruments, and so on, such as personal computers, video cameras and mobile phones.

The invention claimed is:

1. A method of producing a sulfide solid electrolyte, the method comprising:
   mixing a raw material inclusion comprising a lithium element, a sulfur element, a phosphorus element, and a halogen element to obtain a first sulfide solid electrolyte having a volume-based average particle diameter measured by laser diffraction particle size distribution measurement of 3 μm or more and a specific surface area measured by a BET method of 20 m²/g or more; and
   subjecting the first sulfide solid electrolyte to a mechanical treatment comprising (i) disintegration and/or (ii) granulation, using a pulverizer and/or an agitator to obtain a second sulfide solid electrolyte.

2. The method of to claim 1, wherein the mechanical treatment is performed using a solvent.

3. The method of claim 1, wherein the mechanical treatment is performed with a ball mill, a bead mill, or a high-speed rotation thin-film-type agitator.

4. The method of claim 1, wherein the mechanical treatment is performed with a high-speed rotation thin-film-type agitator.

5. The method of claim 1, further comprising:
   heating the second sulfide solid electrolyte after the mechanical treatment.

6. The method of claim 1, wherein mixing further comprises mixing in a complexing agent.

7. The method of claim 6, further comprising:
pulverizing an electrolyte precursor obtained through the mixing.

8. The method of claim 6, further comprising:
heating an electrolyte precursor obtained through the mixing, or an electrolyte precursor pulverized product obtained through pulverizing the electrolyte precursor.

9. The method of claim 1, wherein the second sulfide solid electrolyte has a volume-based average particle diameter in a range of from 0.05 to 10 μm.

10. The method of claim 1, wherein the second sulfide solid electrolyte has a specific surface area in a range of from 0.1 to 70 $m^2/g$.

11. The method of claim 1, wherein the mixing comprises contacting the raw material inclusion with a complexing agent.

12. The method of claim 1, wherein a circumferential velocity of the rotating body in the mechanical treatment (rotational speed in the apparatus) is in a range of from 0.5 to 55 m/s.

13. The method of claim 1, wherein a molar blending ratio of the lithium element to the sulfur element to the phosphorous element to the halogen atom is in a range of from 1.1 to 1.7:1.2 to 1.8:0.2 to 0.6:0.05 to 0.5.

14. The method of claim 1, wherein the first sulfide solid electrolyte material, the second sulfide solid electrolyte material, and the crystalline sulfide solid electrolyte comprise no ether compound.

15. The method of claim 1, wherein the first sulfide solid electrolyte material and the second sulfide solid electrolyte material comprise an amine complexing agent.

\* \* \* \* \*